United States Patent [19]

Mazelsky

[11] 4,408,738
[45] Oct. 11, 1983

[54] VARIABLE ENERGY ABSORBING SYSTEM FOR CRASHWORTHY HELICOPTER SEATS

[75] Inventor: Bernard Mazelsky, West Covina, Calif.

[73] Assignee: ARA, Inc., City of Industry, Calif.

[21] Appl. No.: 303,788

[22] Filed: Sep. 21, 1981

[51] Int. Cl.³ .............................................. B64D 25/04
[52] U.S. Cl. ............................ 244/122 R; 244/122 B; 297/216; 280/808; 267/131; 188/299
[58] Field of Search ..................... 188/299; 244/122 B, 244/122 R, 17.27; 297/216, 470; 280/801, 808, 104; 267/131, 132, 133

[56] References Cited

U.S. PATENT DOCUMENTS

| | | | |
|---|---|---|---|
| 3,701,499 | 10/1972 | Schubert et al. | 244/17.27 |
| 3,885,809 | 5/1975 | Pitcher | 280/104 |
| 3,918,545 | 11/1975 | Andres et al. | 244/122 B |

Primary Examiner—Trygve M. Blix
Assistant Examiner—Ivy M. Shum
Attorney, Agent, or Firm—Herzig & Walsh Inc.

[57] ABSTRACT

An improved crashworthy helicopter seat primarily for combat aircraft includes at least upper, intermediate and lower pairs of energy absorbers attached between the seat bucket and the frame of the aircraft and operable in both tension and compression. The energy absorbers comprise a plurality of telescoped tubes interfitted into one another and having coils of wire frictionally engaged between adjoining tubes such that energy is dissipated by motion of the tubes relative to one another through the plastic deformation of the coils of wire. The energy absorbers are adjustable to optimize safety parameters of occupants of the seat under a range of potential crash conditions including the most probable crash condition, for occupants having a substantial range of weight and size. Adjustability of the energy absorbers is accomplished by intermediate electromechanical apparatus which is responsive to the girth of the occupant of the seat as determined by the extension of an adjustable lap belt fastened around the torso of the occupant of the seat.

39 Claims, 34 Drawing Figures

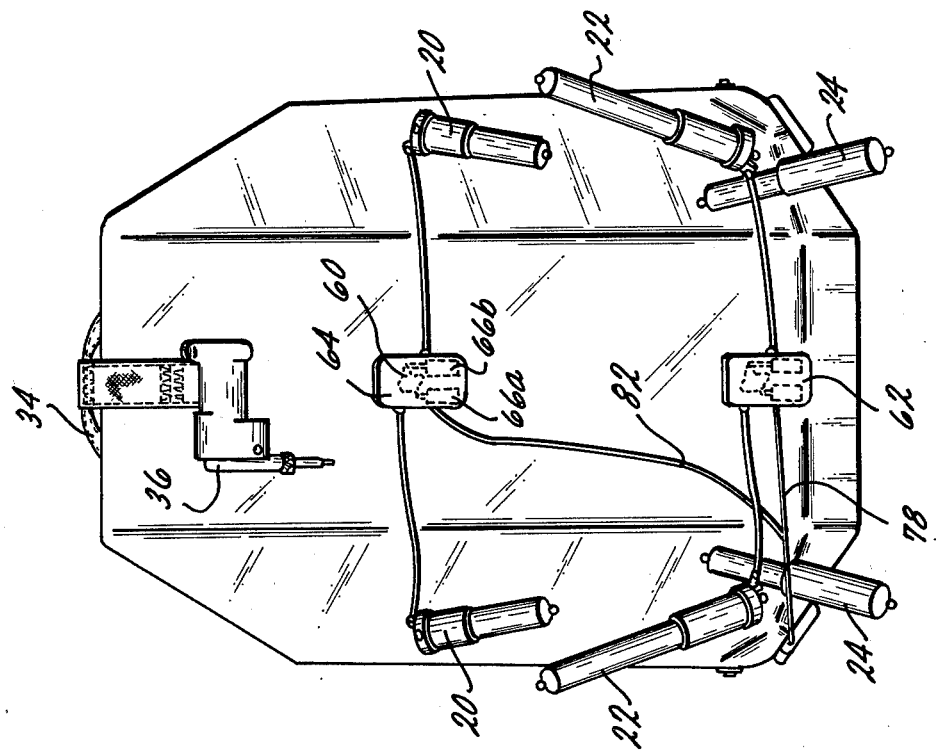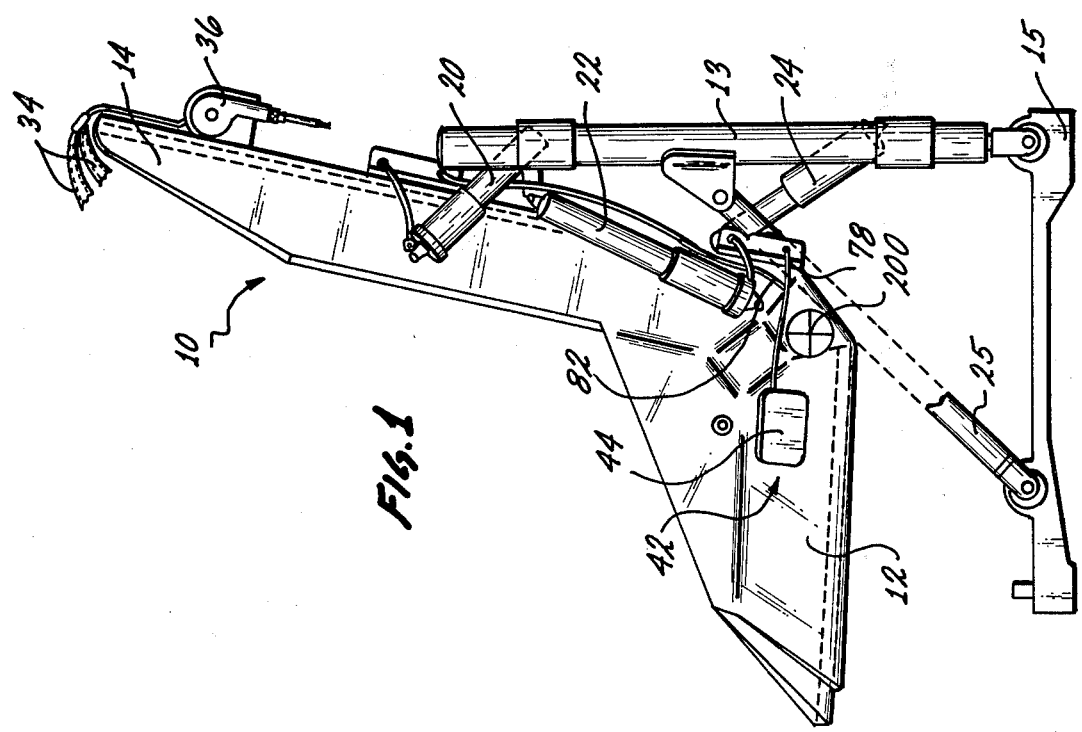

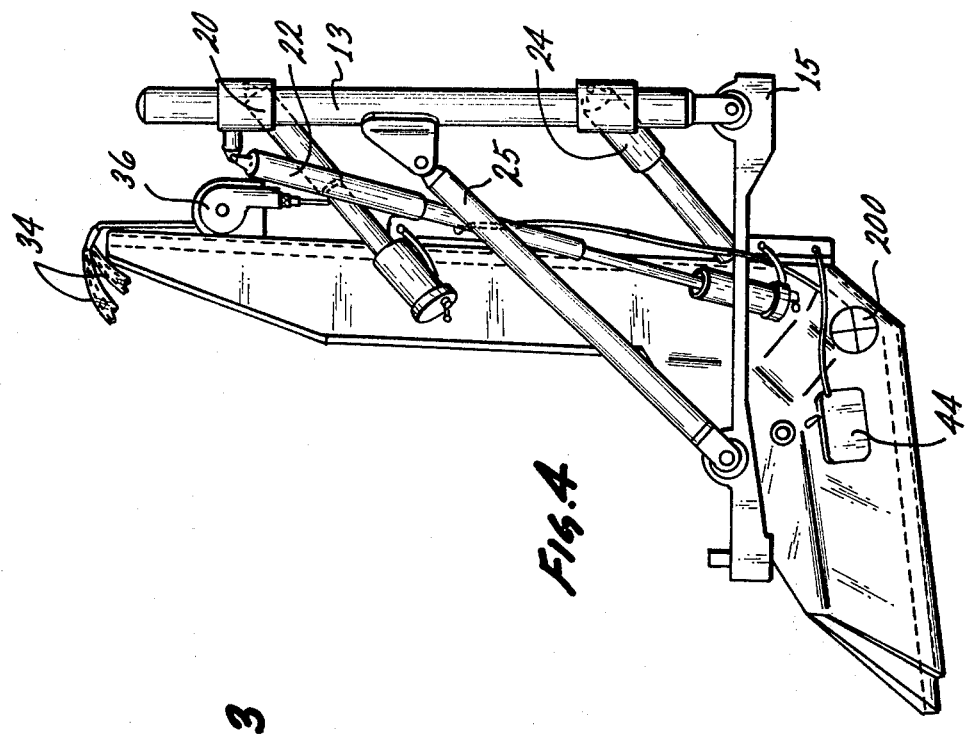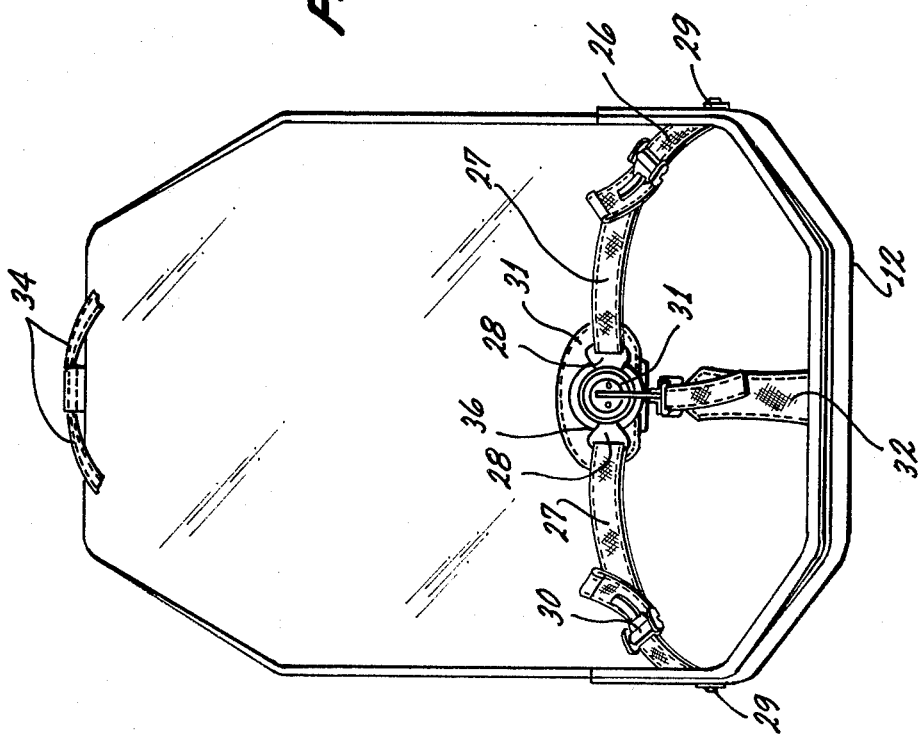

U.S. Patent   Oct. 11, 1983   Sheet 3 of 19   4,408,738
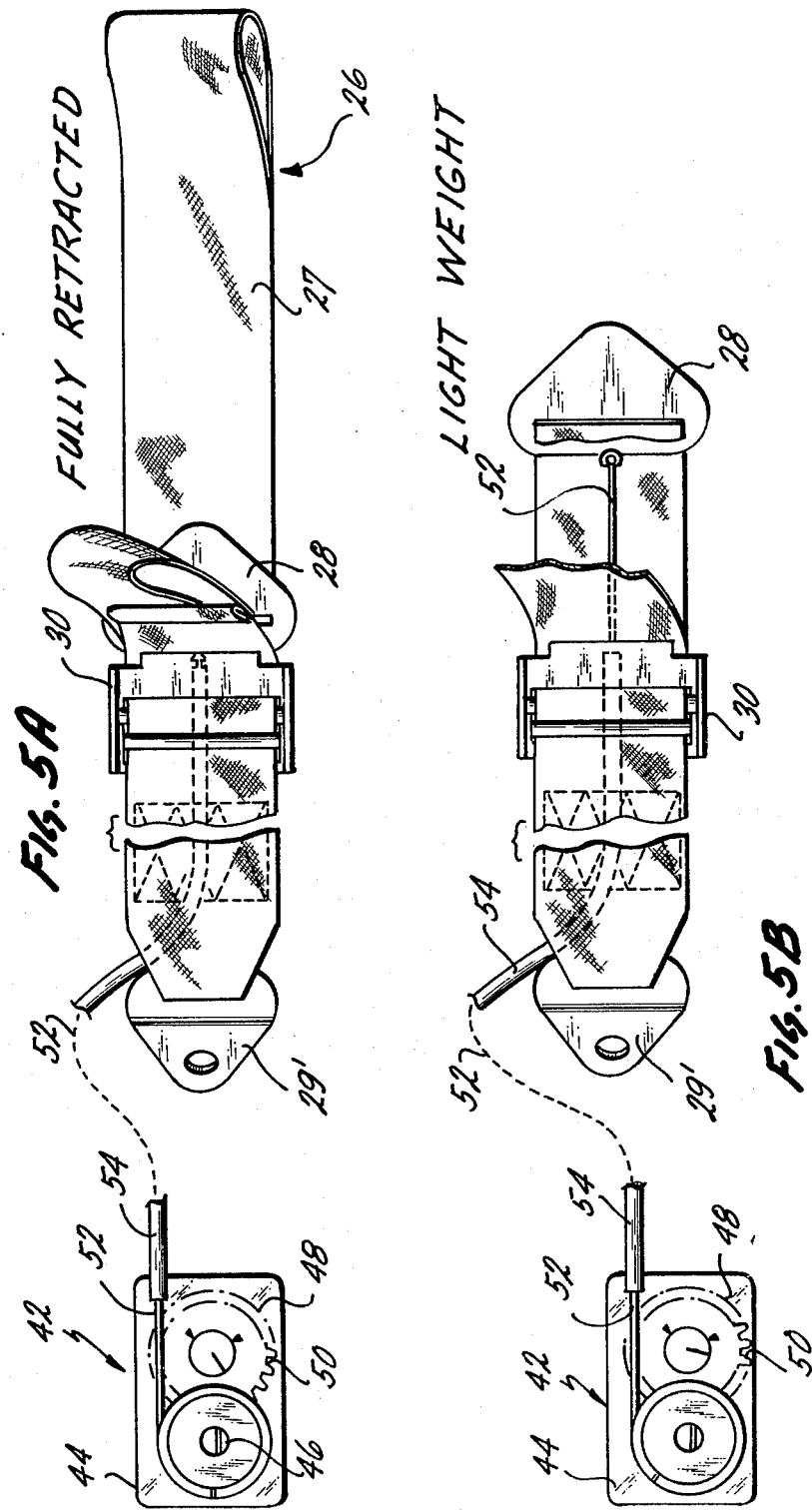

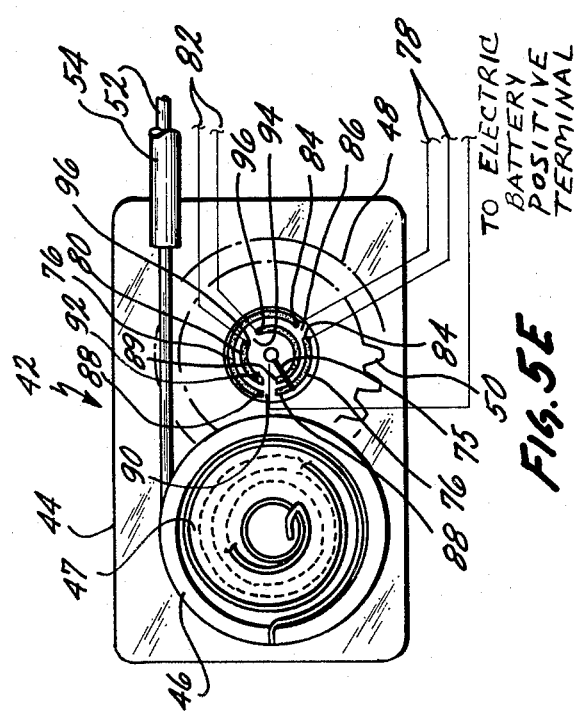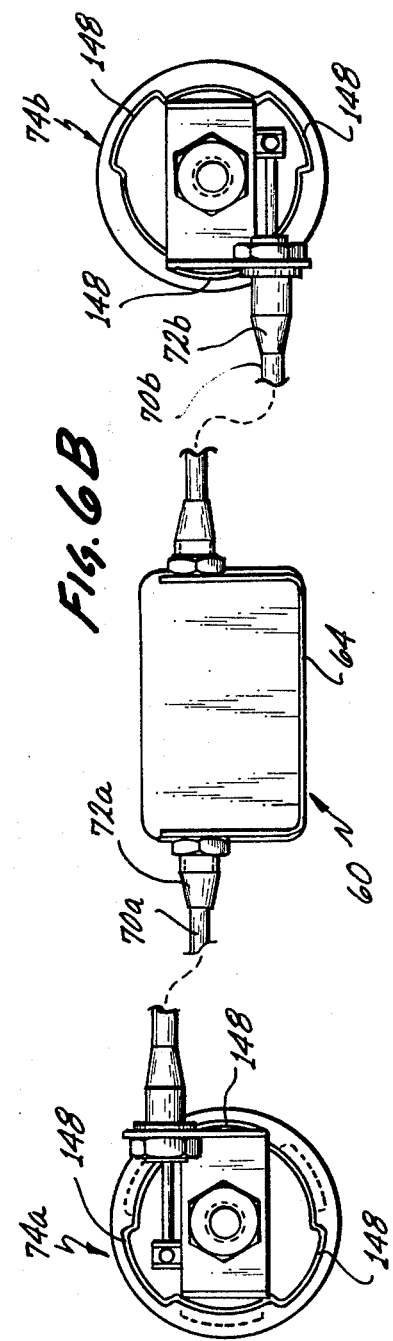

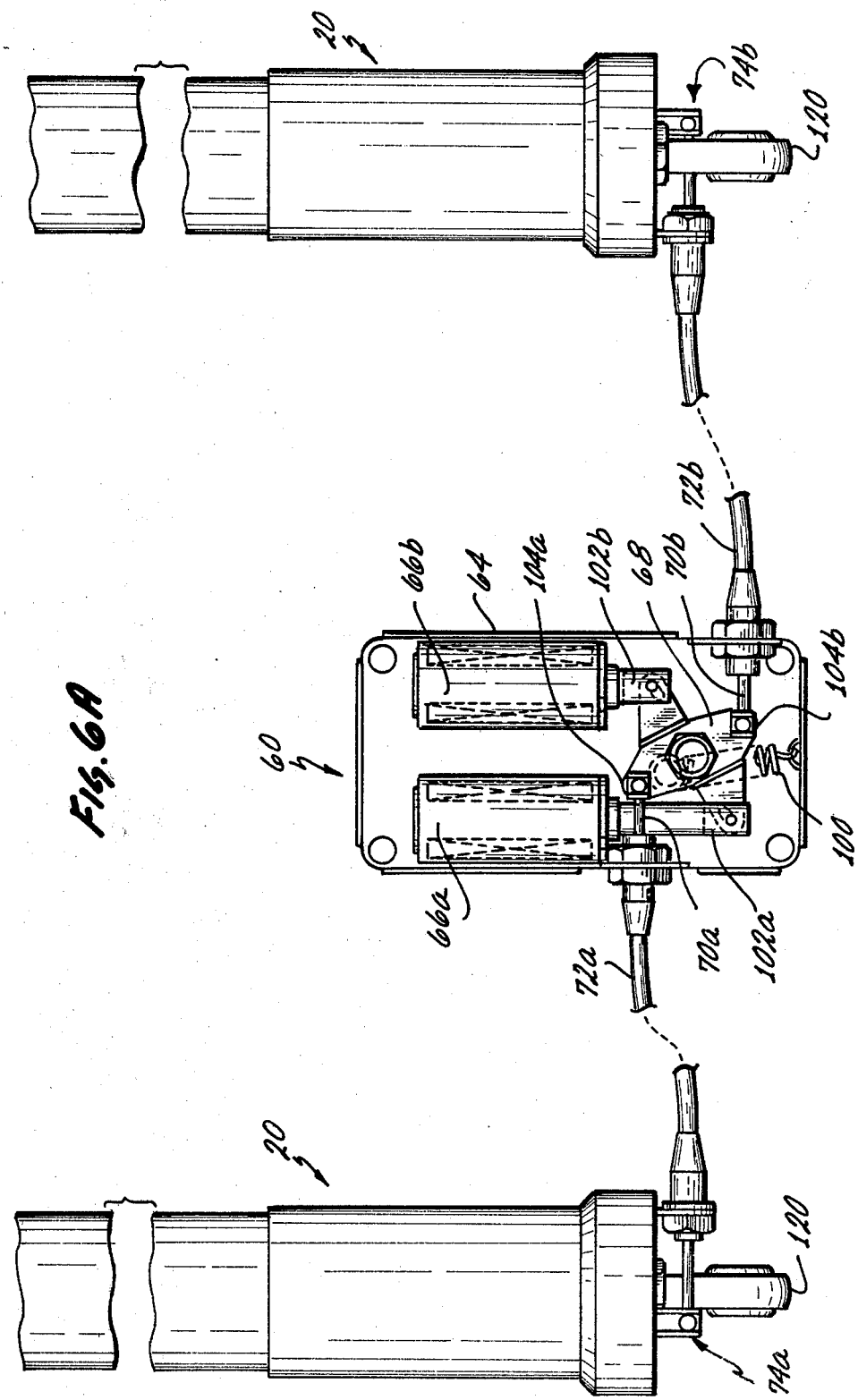

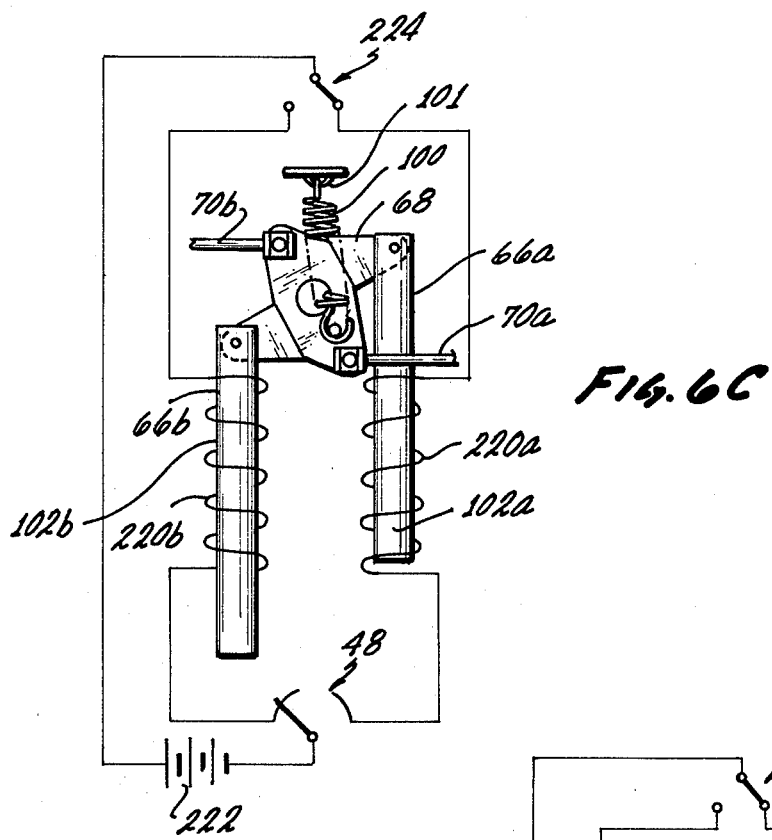
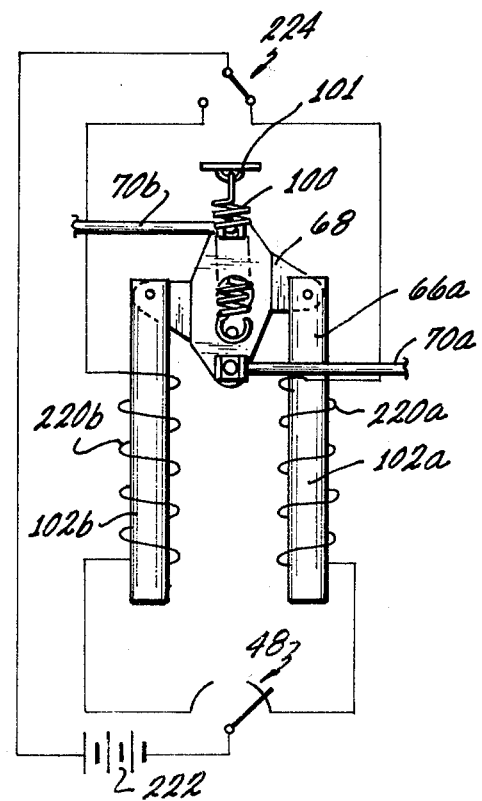
FIG. 6C
FIG. 6D

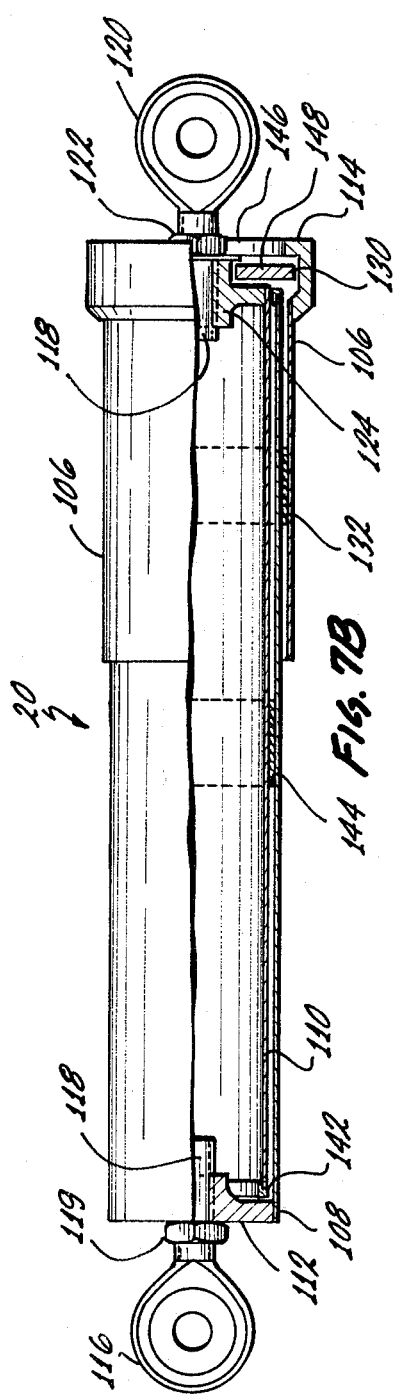
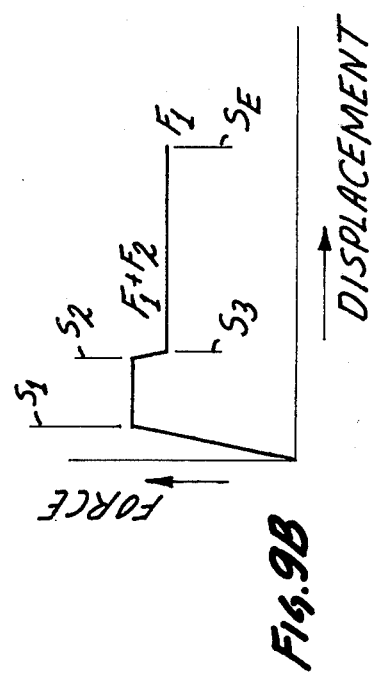
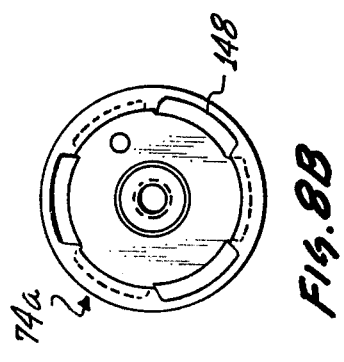

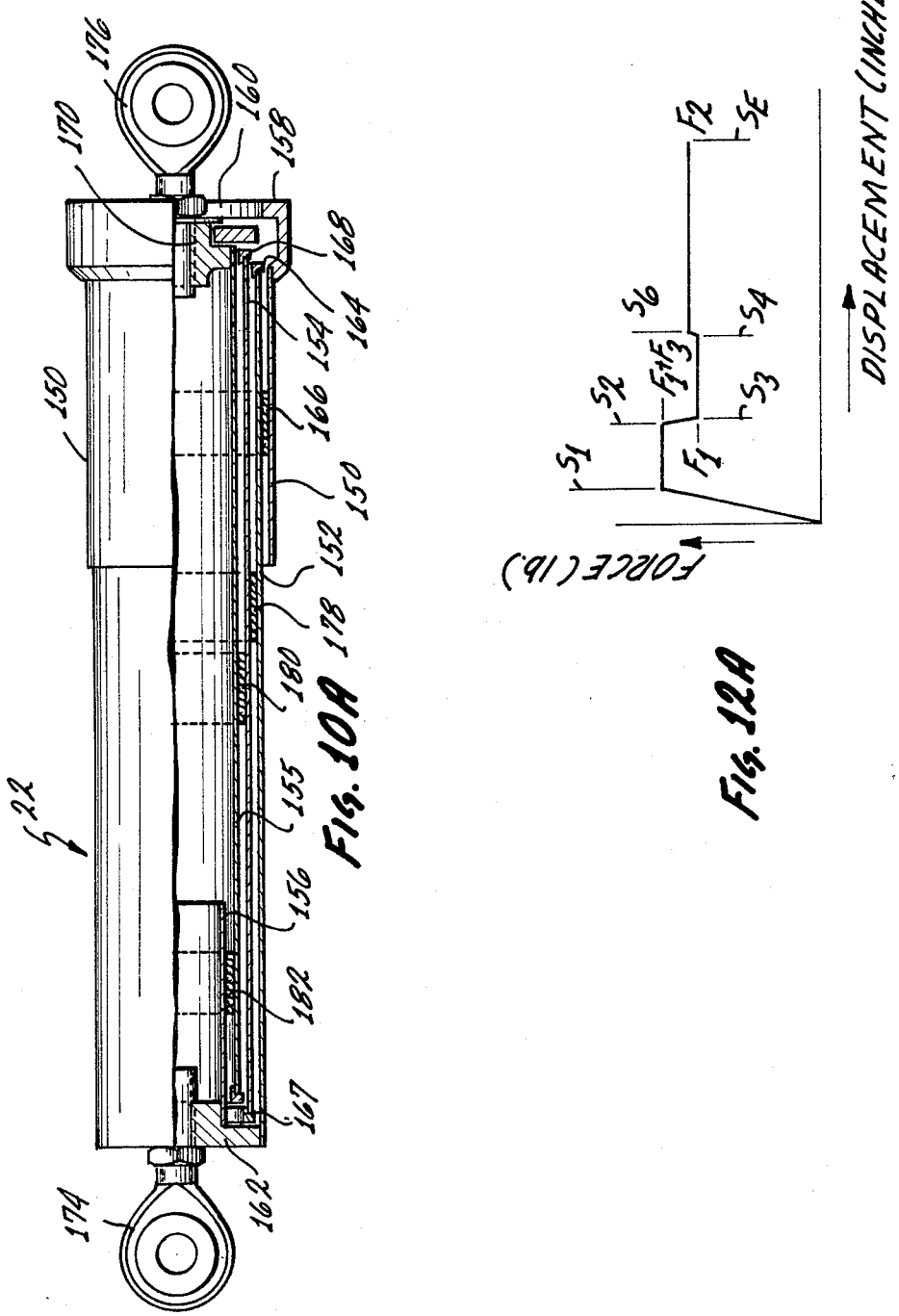

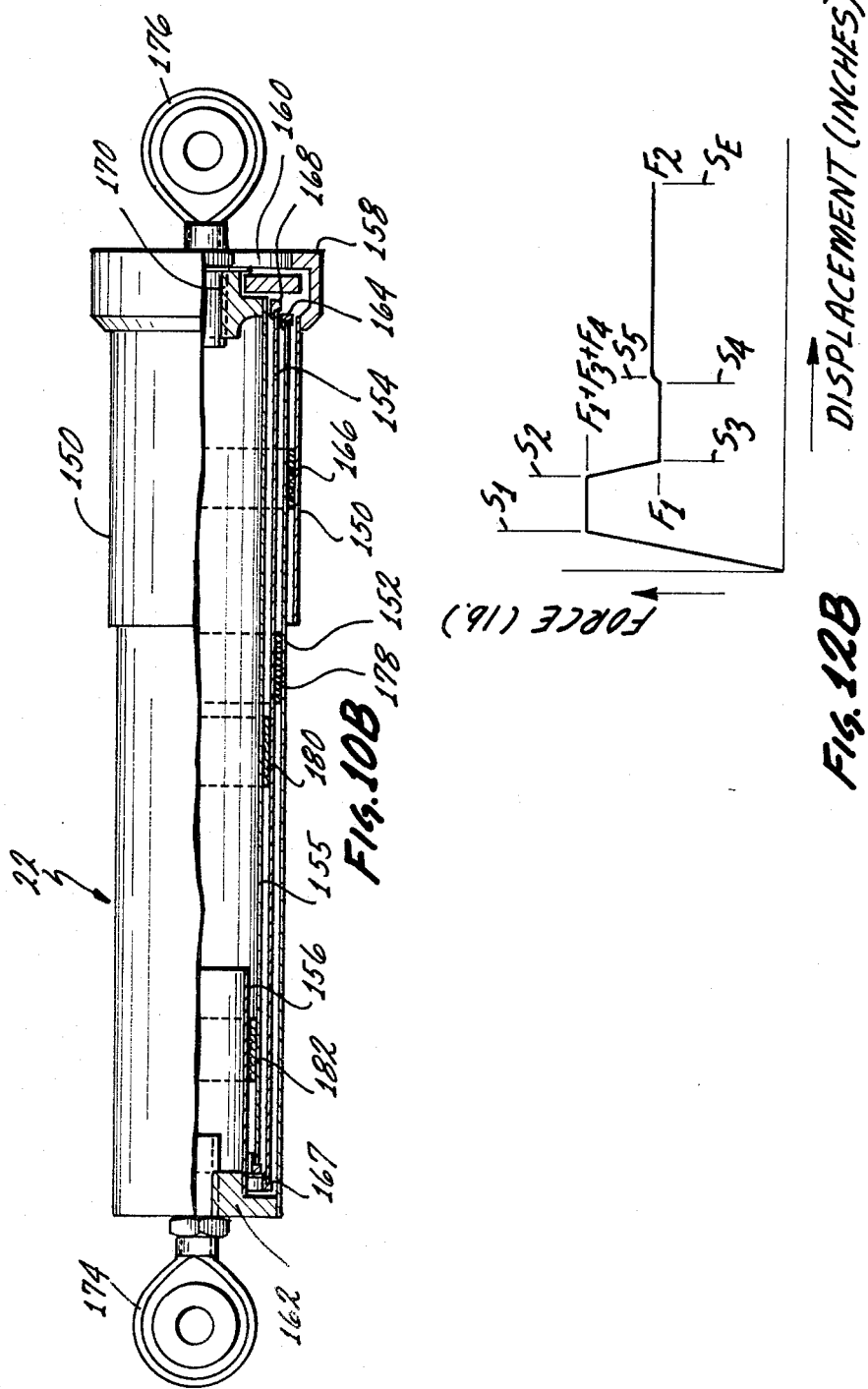

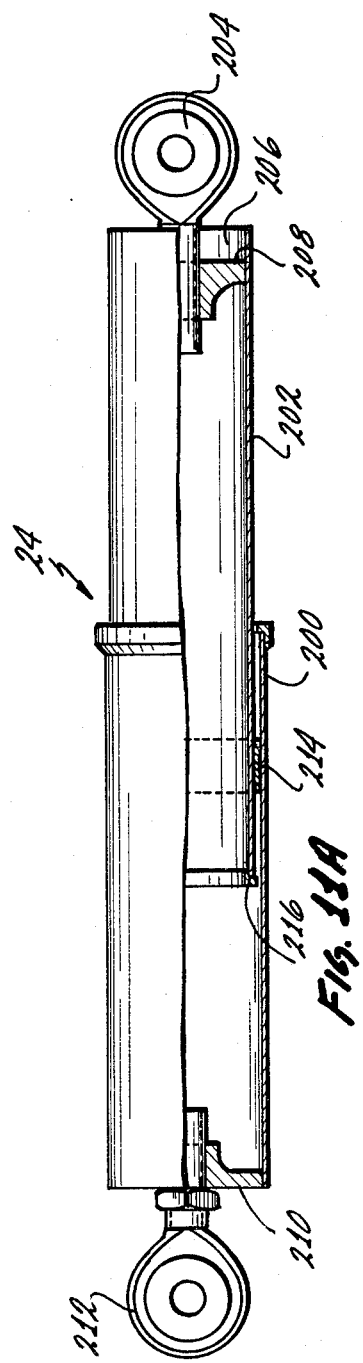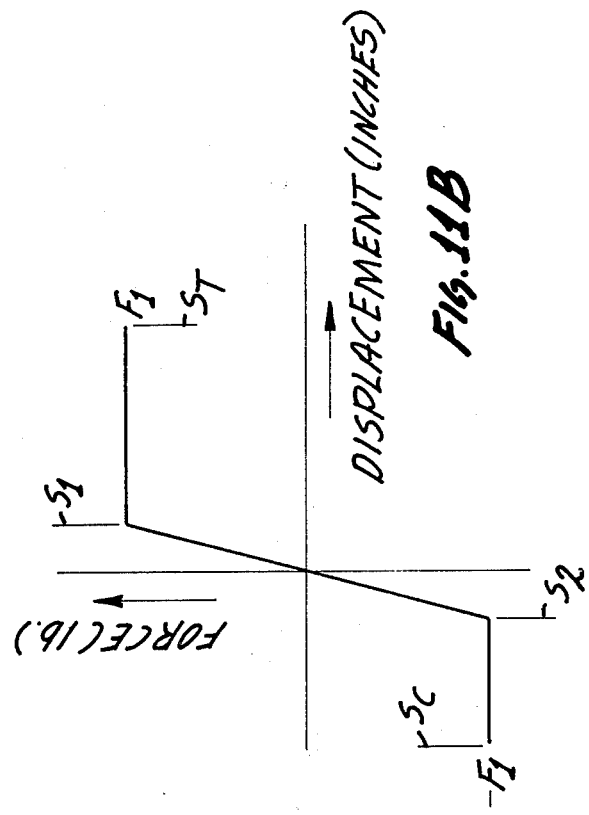

| OCCUPANT WEIGHT PERCENTILE | PEAK ACCELERATION (G'S) | C.G. DISPLACEMENT (IN.) |
|---|---|---|
| 5% | 18.0 | 14.7 |
| 50% | 19.6 | 14.5 |
| 95% | 19.6 | 16.6 |

FIG. 14

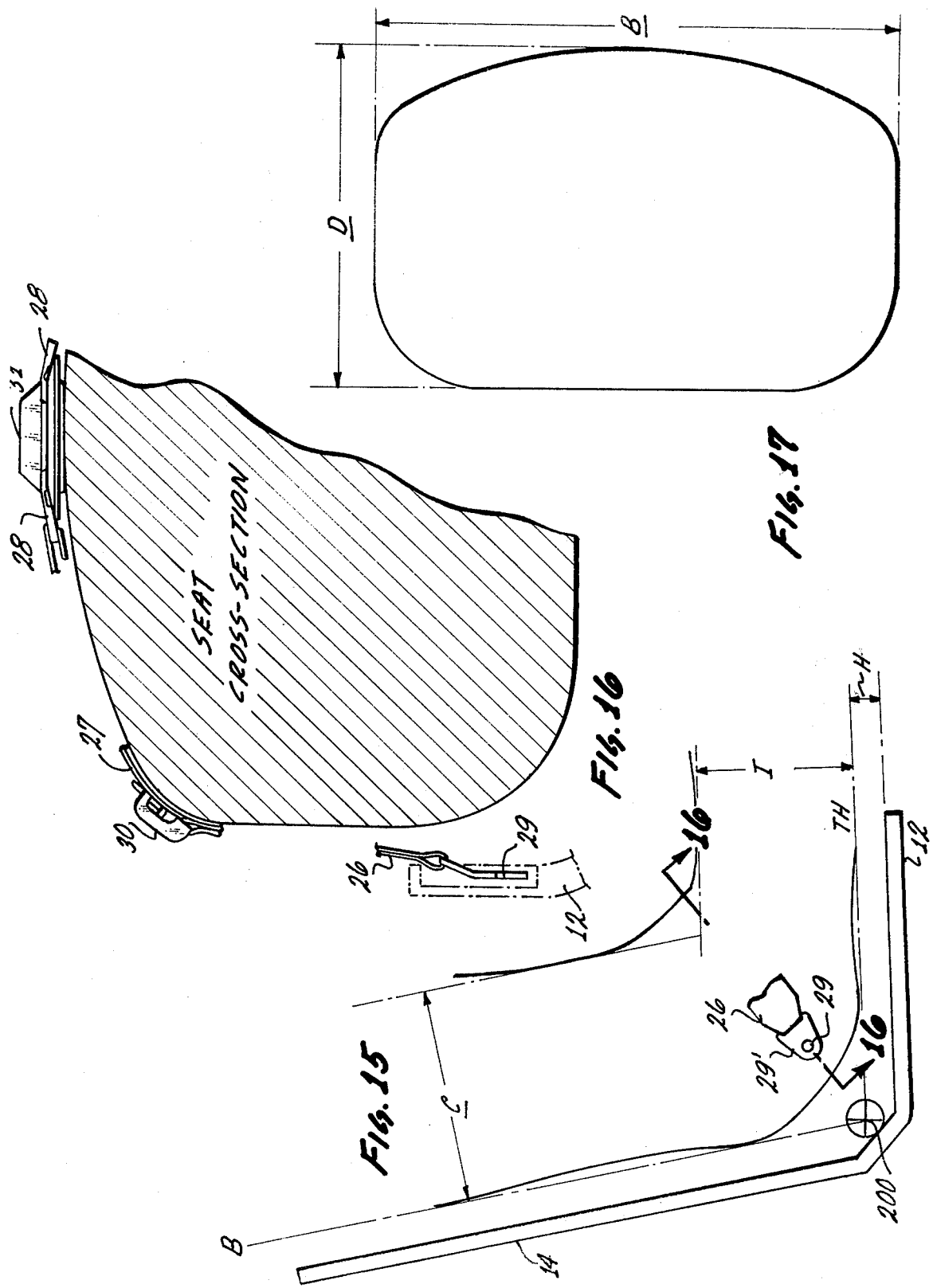

VARIABLE ENERGY ABSORBING SYSTEM FOR CRASHWORTHY HELICOPTER SEATS

BACKGROUND OF THE INVENTION

1. Field of the Invention

The invention relates to crashworthy seats for use in aircraft, particular helicopters.

2. Description of the Prior Art

The recent sharp increase in military and civilian use of helicopters has induced a concurrent need for improved means for protecting the safety of occupants, particularly in a military context, under crash conditions. Substantial research has been accomplished on the nature of helicopter crashes, and particular attention has focused upon the subject of defining a single crash pulse most accurately representing the most probable type of crash for helicopter type aircraft. A particular pulse shape has been discerned and has been accepted by virtually all military agencies in the United States. Thus, it is this shape which must be met in providing safety for occupants of helicopter seats, under crash conditions.

Besides meeting the requirements of the most probable crash pulse referred to above, further requirements of an effective crashworthy helicopter seat include safety for users having a range of body weight. Studies have indicated that the maximum tolerable deceleration along the human spine for appreciable time intervals, i.e., 0.006 second, is approximately 23 g's. Under a vertorial analysis of the accepted most probable crash pulse, the main acceleration vector is that identified along the spine of the occupant. Such a crash pulse at an impact velocity of 50 feet per second will cause a peak deceleration of approximately 48 g's. This is substantially higher than the maximum tolerable deceleration. Since force levels in energy absorber elements are fixed at prescribed levels, "g" values experienced will increase with decrease of weight of the occupant of the seat. Because operating distance for energy absorber elements in aircraft is fixed, force levels in existing energy absorbers are determined by the available operating distance in the aircraft for attenuating for the largest occupant weight without permitting the seat to contact the floor of the aircraft with appreciable velocity. This has the effect of penalizing lighter weight seat occupants subjecting them to possible injury or death in crashes from which persons of greater body weight would emerge relatively uninjured.

In U.S. Pat. Nos. 3,369,634 and 4,150,805, both to Applicant, energy absorber systems were disclosed and claimed capable of use with crashworthy helicopter seats, for the purpose of protecting occupants thereof from injury resulting from the extreme accelerations experienced in aircraft crashes. In copending application Ser. No. 192,958 is disclosed and claimed a system of energy absorbers with parameters adaptable to optimizing safety of helicopter seat occupants of particular weight percentiles. In particular applications, it has been found useful to provide an energy absorbing system which is adjustable, in place, to optimize operational characteristics for occupants in differing weight percentiles.

CROSS-REFERENCE TO RELATED PATENTS AND PATENT APPLICATIONS

Applicant incorporates by reference herein the subject matter of U.S. Pat. Nos. 3,369,634 and 4,150,805, both to Applicant, and further incorporates by reference the subject matter disclosed in U.S. Pat. application Ser. No. 06/192,958, filed Oct. 1, 1980, also to Applicant.

SUMMARY OF THE INVENTION

A variable energy absorbing system for crashworthy seats in aircraft to protect occupants of varying weights from crash-induced injury comprises sensor means connectable to a seat for sensing the weight of occupants thereof and for providing a signal in response thereto; actuation means connectable to the sensor means and responsive to signals therefrom to actuate energy absorber means; and energy absorber means connectable to the actuation means and connectable between the seat and the frame of the aircraft, the energy absorber means absorbing energy from a crash in at least a first stage following the crash and a second stage following the first stage, the energy absorber means absorbing energy at a higher level of force during the first stage and at a lower level of force in the second stage, the energy absorber means being responsive to signals from the actuation means to vary the level of force in the first or second stage in response to varying weight of occupants of the seat.

BRIEF DESCRIPTION OF THE DRAWINGS

FIG. 1 is a side elevation, somewhat schematic, of a crashworthy seat in accordance with the invention, in the pre-impact configuration;

FIG. 2 is a rear view of a portion of crashworthy seat in accordance with the invention, in a pre-impact configuration;

FIG. 3 is a front view, somewhat simplified, of a crashworthy seat in accordance with the invention, in a preimpact configuration;

FIG. 4 is a side elevation, somewhat schematic, of a crashworthy seat in accordance with the invention, in a post-impact configuration;

FIG. 5a is a fragmentary view of a helicopter seat in accordance with the invention depicting a fully retracted lap belt connected to a retractor-position sensor assembly in accordance with the invention;

FIG. 5b is a fragmentary view of a crashworthy helicopter seat in accordance with the invention, depicting a lap belt connected as in FIG. 5a and extended to reflect securement about the torso of a lightweight occupant; k

FIG. 5e is a detailed fragmentary view of a retractor-position sensor assembly employed in accordance with the invention;

FIG. 7b is a perspective view, partially broken away and simplified, of an energy absorber element employed in accordance with the invention, depicted in the engaged or "on" condition;

FIG. 8b is a front view of a load variation disc employed in accordance with the invention, depicted in the engaged condition;

FIG. 9b is a graphical representation of force-displacement relationships of the energy absorber of FIG. 7b, the units of force being pounds and the units of displacement being inches;

FIG. 10a is a perspective view, partialy broken away and simplified, of an energy absorber element employed in accordance with the invention depicted in the disengaged or "off" condition; FIG. 10b is a perspective view, partially broken away and simplified, of an energy absorber element employed in accordance with the invention depicted in the engaged or "on" condition;

FIG. 11a is a perspective view, partially broken away and simplified, of an energy absorber element employed in accordance with the invention;

FIG. 11b is a graphical depiction of force-displacement relationships for the energy absorber of FIG. 11a;

FIG. 12a is a graphical depiction of force-displacement relationships of the energy element of FIG. 10a;

FIG. 12b is a graphical depiction of force-displacement relationships of the energy absorber element of FIG. 10b;

FIG. 13a is a depiction in graphical form of the performance characteristics of crashworthy helicopter seats in accordance with the invention for lightweight seat occupants;

FIG. 13b is a depiction in graphical form of the performance characteristics of crashworthy helicopter seats in accordance with the invention for middleweight seat occupants;

FIG. 14 is a summary in tabular form of the performance characteristics of crashworthy helicopter seats in accordance with the invention for seat occupants of varying weights;

FIG. 15 is a schematic, simplified side view of a portion of a torso of an occupant employing a crashworthy helicopter seat in accordance with the invention;

FIG. 16 is a cross-sectional view of a crashworthy helicopter seat in accordance with the invention taken through the line 16←→16 of FIG. 15;

FIG. 17 is a body cross-section of the occupant of a crashworthy helicopter seat in accordance with the invention depicted in FIG. 15 taken through the line 16←→16.

DETAILED DESCRIPTION OF THE INVENTION

Figure 5C:
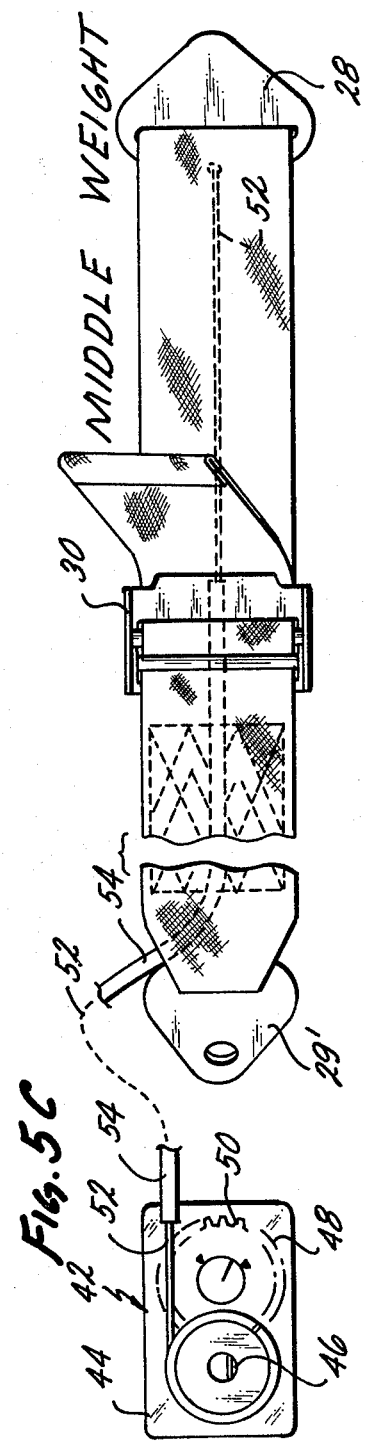
FIG. 5c is a fragmentary view of a crashworthy helicopter seat in accordance with the invention, depicting a lap belt connected as in FIG. 5a and extended to reflect securement about the torso of a middle weight occupant.
Figure 5D:
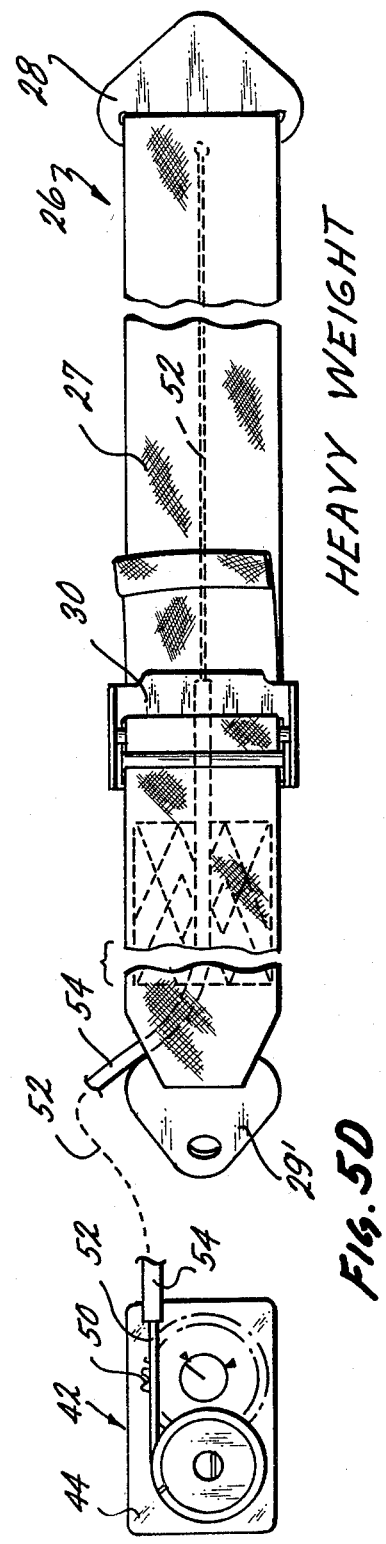
FIG. 5d is a fragmentary view of a crashworthy helicopter seat in accordance with the invention, depicting a lap belt connected as in FIG. 5a to reflect securement about the torso of a heavyweight occupant.

A crashworthy seat 10 in accordance with the invention is depicted in FIGS. 1 through 4. Many of the features of this crashworthy seat have been described in detail in Applicant's copending patent application Ser. No. 192,958 and incorporated by reference herein; such features will be described herein only briefly and only features which differ from those of the previous disclosure will be described in detail.

Seat 10 includes a seat bucket member 12 and a seat back plate 14. The seat bucket 12 and the seat back plate 14 are integral and are attached to a veritcal column 13 which in turn is attached to a rail guide 15. The latter is attached to a rail (not shown) which is attached to the frame of the helicopter. A secon vertical column (not shown) is symmetrically disposed with respect to, and attached to, the seat 10 in the same manner as the first vertical column referred to. At an upper portion of the seat back plate 14 a symmetrically arranged pair of energy absorbers 20 are pivotably attached between the seat back plate 14 and the aforesaid vertical columns 13. The energy absorbers 20 are symmetrical with respect to the vertical column 13 and the seat back plate 14.

A pair of intermediate energy absorbers 22 are attached between the seat back plate and the vertical columns. The intermediate energy absorbers 22, like the upper energy absorbers 20, are disposed symmetrically with respect to the seat back plate 14 in that they are equidistant from the vertical center line thereof and equidistance from the seat bucket 12. A pair of lower energy absorbers 24 are disposed below intermediate energy absorbers 22 and are also disposed symmetrically with respect to the seat back 14. Attachment of the upper, middle, and lower energy absorbers to the aforesaid vertical columns is as described in the cross-referenced patents and application. Briefly, the energy absorbers are attached to the vertical column and the seat back 14 in such a manner as to permit them to pivot about the points of attachment in response to crash-induced forces. A pair of lower lateral stabilizing rods 25 are attached between the seat back 14 and the aforesaid vertical columns as described in the previous patent application.

Referring also to FIGS. 5a–5e, inclusive, a lap belt 26 is provided to secure the occupant in seat 10. The lap belt is mounted and operable in conventional fashion to have the capability to extend in order to accommodate torsos of varying dimensions. As depicted, lap belt 26 consists of a pair of adjustable sections 27, each section 27 having a loop (not shown), in which is disposed a lug 28. Each lap belt section 27 is attached to one of a pair of fittings 29 by means of a securing fitting 29' and includes a belt adjustment clasp assembly 30 which permits adjustment of the length of the belt section 27 in conventional fashion. A buckle 31 is attached to a vertical seatbelt 32 fastened to straps 34 which are attached to, and played out from, an adjuster assembly 36 attached to the back of seat back 14. Buckle 31 (shown in schematic and simplified form only) includes an internal circular rim and external slots 36 for passage therethrough of lap belt 26 an lugs 28.

Referring also to FIGS. 6a and 6b, a retractor-position sensor assembly 42 is attached to the side of seat bucket 12 and includes a housing 44. Within housing 44 is pivotably mounted a cylindrical retractor member 46. A spiral spring member 47 is engaged with the retractor member 46 to provide a biasing force thereto. A rotary slide switch 48 is pivotably mounted in housing 44 and is engaged by means of gear teeth 50 with retractor 46. A retractor cable 52 is attached to the cylindrical retractor at one end and to a lug 28 at the other end. Cable 52 is contained within a cable conduit 54 of flexible material, such as cloth or plastic, disposed upon or within lap belt 26.

FIGS. 5a, 5b, 5c, and 5d depict four positions of lap belt 26 and corresponding positions of retractor 46 and slide switch 48. FIG. 5a depicts the fully retracted position wherein the belt 26 is allowed to move freely and has moved to the retracted position under the biasing influence of retracting spring 47. This is the position which corresponds to non-use of the lap belt or to an unbuckled condition thereof.

FIG. 5b depicts the configuration of the lap belt and retractor-position assembly 42 when the lap belt is secured around the torso of a lightweight occupant of seat 10. The lightweight occupant is one who is in the fifth percentile of weight (approximately 133 pounds). As described in detail hereinbelow, the invention utilizes a relationship between girth of the torso of the occupant of the seat with the weight of the occupant. Thus, the girth that corresponds to the "lightweight" setting of the lap belt 26 is that of an occupant in the fifth weight percentile at 133 pounds. The configuration in the lightweight setting is reached through rotation of the retractor 46 in engagement with the rotary slide switch 48 to a first or lightweight position thereof.

In like manner, FIGS. 5b and 5c depict the configuration of the system for occupants having girths corresponding to "middleweight" and "heavyweight" percentiles. The middleweight percentile corresponds to an occupant weight in the 50th percentile (with weight of 165 pounds), the heavyweight occupant being one in the 95th percentile corresponding approximately to a weight of 212 pounds. As the length of sections 27 of lap belt 26 is adjusted to accommodate girth of the occupant, the length of the path of the lugs 28 changes, increasing with added girth of occupants, producing corresponding rotation of the retractor 46 and accompanying rotation of the rotary slide switch 48. As depicted, there is approximately a quarter turn or 90° displacement of the rotary slide switch between successive positions of the rotary slide switch and retractor. As depicted, at the outer limit or heavyweight configuration, the lug 28 is disposed within a loop at the outer end of lap belt 26.

An upper energy absorber actuation assembly 60 is attached to the rear side of seat back 14 between upper energy absorbers 20; a middle or intermediate energy absorber actuation assembly 62 is attached to the rear of seat back 14 below assembly 60 and between intermediate energy absorbers 22. As seen in detail in FIGS. 6a, 6b, energy actuation assembly 60 comprises a housing 64 in which are mounted a pair of solenoids 66a, 66b. A crank member 68 is pivotally mounted in housing 64. Cables 70a, 70b are attached at their inner ends to crank 68. Cables 70a, 70b pass through conduits 72a, 72b, respectively, and connect at their outer ends to load variation disc control members 74a, 74b respectively. Cables 70a, 70b, 72a, 72b are of the "push-pull" type which operates in both tension and compression.

Load variation discs 74a, 74b are attached to the left member and the right member of energy absorber pair 20 ("left" and "right" are with reference to the viewer of the drawings). The arrangement of the actuation assembly and energy absorber is the same for the left and right members of a particular energy absorber pair and for the upper energy absorber 20 and the intermediate energy absorbers 22; thus, in the discussion which follows, a detailed description will be given as it pertains to one energy absorber, and the discussion will be applicable to all unless otherwise specified.

Referring to FIG. 5e, rotary slide switch 48 includes a rotating switch member 75 pivotally attached to the housing of retractor 42. Rotary slide switch 48 further includes first contact members 76 which are attached to the housing of retractor 44 and are not rotatable. First contact members 76 are in the form of a pair of separated semicircular metallic strips with a layer (not shown) of insulation on their surface and are connected to leads 78 to the upper energy absorber actuation assembly 60. In like fashion, second contact members 80 are attached to the housing of retractor 44 and are in the form of a separated semicircular metallic strips with insulation on the surface thereof. Contact members 80 are attached by leads 82 to the intermediate energy absorber actuation assembly 62. Switch member 75 is connected to the positive terminal of an electric battery (not shown) which is the power source for the solenoids 66a, 66b in the upper energy absorber actuation assembly 60 and the solenoids in intermediate energy absorber actuation assembly 62. The first contact members 76 define switch contact points constituting a first pair of ends 84 of the respective hemispherical contact members 76 oppositely disposed to one another across a gap 86 defined between the ends 84. Switch member 75 is rotatable to make electrical contact with contact members 76 in gap 86 in response to the position of the lap belt fitting 26. In a similar fashion, a second contact gap 90 is defined at a second pair of ends 88 of the contact members 76. A similar gap 92 is defined adjacent gap 90 between a first pair of ends 89 of contact members 80. Thus, the switch member 75 is capable of engaging and making electrical contact with, contact members 76, 80, simultaneously at gaps 90, 92, corresponding to the "heavyweight" configuration of the lug 28 as described more fully hereinbelow.

Contact members 80 define a contact gap 94 at a second pair of ends 93 between ends 96 of the contact members 80, adapted to make electrical contact with contact member 75 when lug 28 is at a particular position depending upon the girth of the user of the helicopter seat, as described in detail hereinbelow.

Referring to FIGS. 6a–6g, inclusive, actuation assembly 60 includes a spring member 100 attached to an eye-support member 101 and connected to crank 68 biasing it to the disengaged or "off" position. Set solenoid 66a includes an armature 102a and reset solenoid 66b includes an armature 102b. Crank member 68 is attached to armatures 102a and 102b. A coil 220a is depicted in semi-schematic form as wound about the armature 102a of solenoid 66a, and in similar fashion, a coil 220b is depicted as being wound about armature 102b of solenoid 66b. A battery 222 is in series with rotary slide switch 48 (depicted somewhat schematically). A solenoid actuated switch 224 shown in schematic form is in series with battery 222 and is connected mechanically to be actuatable by solenoids 66a, 66b.

Since the actuation assemblies employed with the invention are identical to one another, and the "heavyweight" and the "middleweight" positions are distinguishable from one another by the fact that in the former condition the upper and intermediate energy absorbers 20, 22, respectively, are in the engaged or "on" condition and in the latter, only the upper energy absorbers are "on", the description which follows will refer in terms only to one actuation assembly but will, of couse, apply to all such assemblies employed in connection with the invention.

As depicted in FIG. 6c, the actuation assembly is in the "off" or low load condition. This corresponds to the situation in which there is either no occupant in the seat 10 or in which the occupant's girth is not sufficient to actuate the rotary slide switch 48. In the "off" condition of the actuation assembly, the rotary slide switch is open as is the solenoid actuator switch 224, and the crank 68 is held in an open position by the biasing spring 100. In the open position, the set and reset solenoid 66a, 66b are so positioned that the switch 224 makes contact with the coil 220b associated with armature 102b of solenoid 66b.

Figure 6G:
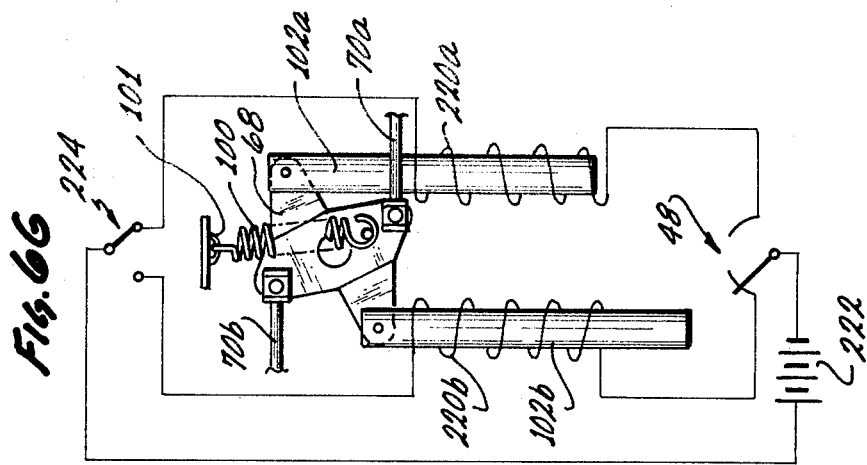
FIG. 6a depicts in a fragmentary top view an energy absorber actuator assembly connected to energy absorber elements in accordance with the invention.
FIG. 6b depicts the assembly of FIG. 6a in a front view.
FIGS. 6c–6e, inclusive, depict in somewhat schematic form the electromechanical operation of a portion of the energy absorber actuator assembly employed in connection with the invention.
Figure 6F:
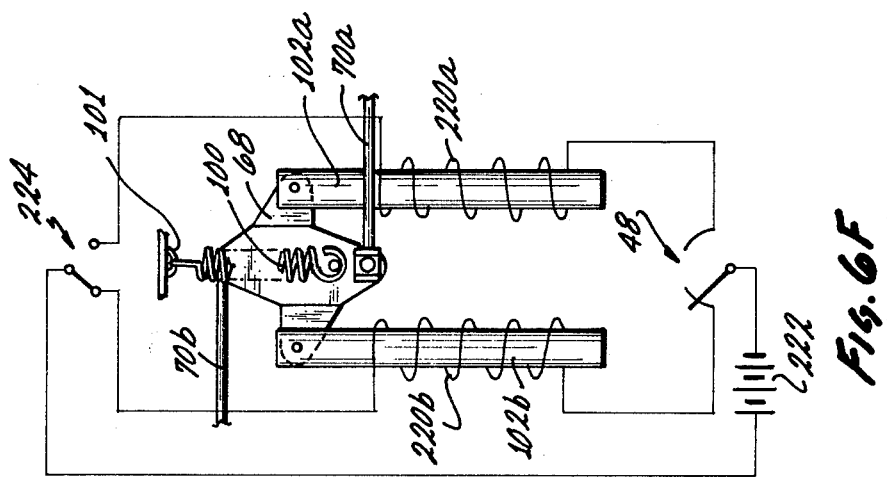
Figure 6E:
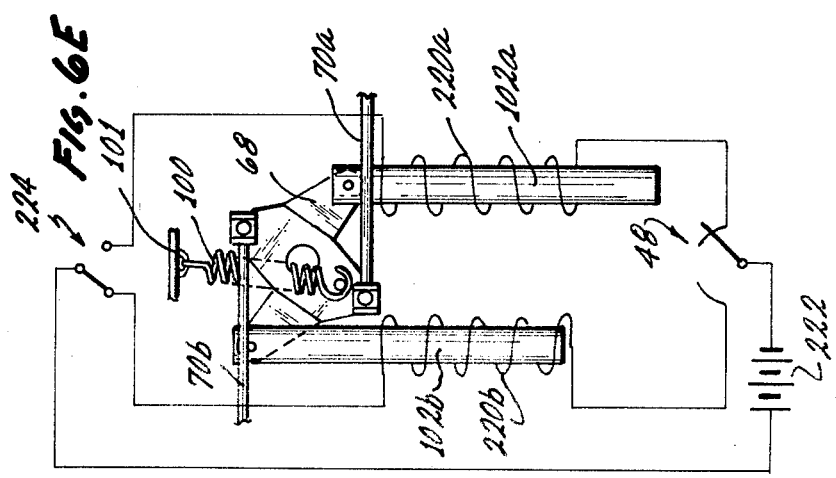

As depicted in FIG. 6d, the rotary slide switch 48 has been actuated by donning of the lap belt by an occupant of sufficient girth. As a result, the set solenoid circuit is closed, which causes the set solenoid armature 66a to be set into motion and retracted, thus reaching the position depicted in FIG. 6d. At this point, the rotation of crank 68 attached to solenoid 66a, 66b has caused cable 72a to rotate disc 74a to the closed position, thus responding to the weight and the girth of the occupant of the seat by actuating an energy absorber accordingly. The inertia of motion of the set solenoid 66a and the crank 68 cause motion of the set solenoid to continue, though the switch 48 now resumes the open condition. Once the solenoid configuration passes the balanced configuration depicted in FIG. 6d (i.e., where solenoids 66a, 66b are at the same height), the spring 100 biases the solenoid 66a and the crank 68 to the position in which the solenoid 66a is in the lower position and the solenoid 66b is in the upper position. This condition is depicted in FIG. 6e and is the opposite condition from that depicted in FIG. 6c wherein the solenoid 66a was in the upper position and solenoid 66b was in the lower position. (The terms "upper" and "lower" are used for clarity and simplicity and refer to the orientation of the solenoids with respect to the upper and lower portions of the page; of course, the invention described and claimed herein can operate in any orientation).

In the condition depicted in FIG. 6e of the solenoids 66a, 66b and crank 68, the disc 74a is in the engaged or load position and there is no drain on the battery 222 since the battery circuit is open. The system will remain in this condition until the lap belt is retracted, as for example, when the occupant of the seat exits the aircraft. Upon retraction of the lap belt, essentially a reverse sequence of events occurs from the depicted in FIGS. 6a, 6c-6e. Upon retraction, the rotary slide switch 48 rotates in the opposite sense from that in which it rotated in the sequence depicted hereinabove until it connects to close the circuit which includes the reset solenoid 66b (FIG. 6f). This causes the armature 224b of solenioid 66b to move downwardly and correspondingly the armature 224a of solenoid 66a to move upwardly until as depicted in FIG. 6f they are at the same level. At this point, the circuit of the solenoid 66b is closed, and the solenoid continues to move under the influence of biasing spring 100 until that circuit is opened and the solenoid 66b assumes the lower position and solenoid 66a assumes the upper position (FIG. 6g). This configuration is identical to the initial configuration depicted in FIG. 6a and as depicted for sake of clarity in order to show the sequence of events. At this point, the disc 74a is in the disengaged condition, and the energy absorbers are in the disengaged or low load condition, the circuits relating to the solenoids 66a, 66b are in the open condition, and battery 222 is experiencing no drain. Thus, the battery 222 provides power only during the brief intervals during which the lap belt is being extended or retracted, and once the appropriate conditions of loading of the engagement discs and the energy absorbers have been achieved, the circuitry goes into the open condition, and the biasing spring 100 holds the system in its desired condition.

Figure 7A:
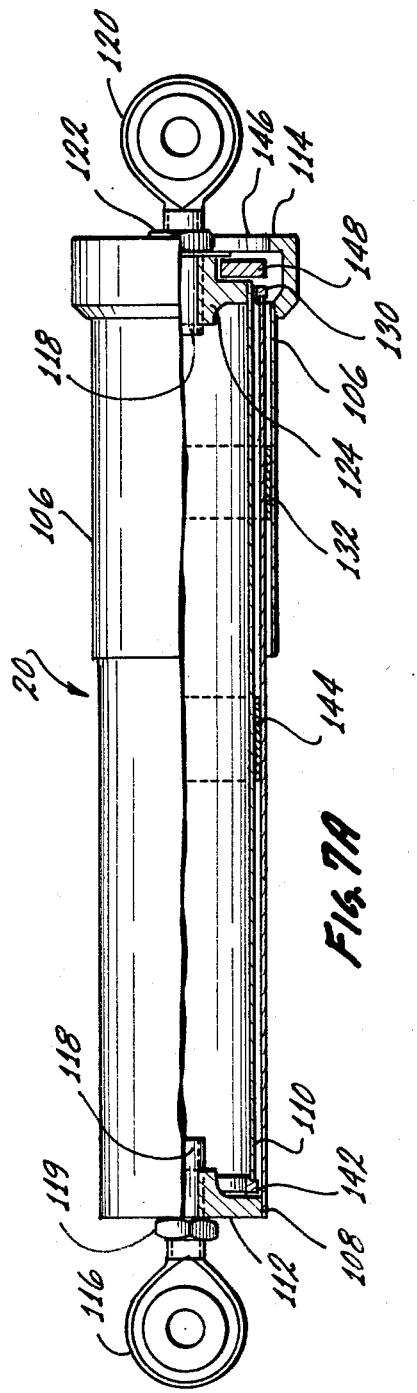
FIG. 7a is a perspective view, partially broken away and simplified, of an energy absorber element employed in accordance with the invention, depicted in the disengaged or "off" condition.

As best seen in FIGS. 7a and 7b, the upper energy absorber members 20 are of the same type as were disclosed and claimed in copending application Ser. No. 192,958 referred to hereinabove and incorporated by reference herein. For this reason, the decription herein will be somewhat brief with a detailed discussion of any differences between the energy absorbers disclosed herein and those in the prior application and of the system aspect of the present invention as it relates to the energy absorbers. Upper energy absorbers 20 comprise a plurality of telescoped tubes comprising an outer tube 106, an intermediate tube 108, and an inner tube 110. The energy absorber 20 has end pieces 112, 114 at its left and right-hand ends, respectively. The end pieces 112, 114 are symmetrically configured so that the portions thereof that are not shown in the drawings, which are partially broken away to show the end pieces, are the same as thos depicted. End piece 114 is a centrally extended, generally circular bracket affixed to the right-hand end of tube 106. End piece 112 comprises a centrally threaded fitting attached at its ends to left-hand end of intermediate tube 108. Attachment of end pieces to tubes is by welding. A ball joint 116 is attached to end piece 112 at the end of a threaded bolt 118 which threadably engages the end piece 112 and a nut 119. A ball joint 120 is secured to end piece 114 by threadably engaging a nut 122 and an inner end piece 124.

As noted, first tube 106 is welded to end piece 114, and intermediate tube 108 is welded to end piece 112. At its right-hand end, intermediate tube 108 is attached to a ring 130. Helical wire coil 132 is frictionally engaged between the inner surface of tube 106 and the outer surface of tube 108. A detailed description of the construction of energy absorbers employed in conjunction with the invention is provided in the above-mentioned U.S. Pat. Nos. 4,066,149 and 3,369,634, incorporated by reference herein, as well as co-pending application, Ser. No. 192,958. Thus, only those matters will be described herein which vary from the earlier disclosures, and common subject matter will be described briefly.

Coil 132 is preferably a solid, non-elastomeric, normally uncompressed body, with each turn constituting an arcuate body adapted to be subjected to cyclical plastic deformation in tension and compression when a turn is rotated about its internal axis, which in this case is the tube 108.

Inner tube 110 is disposed inwardly of intermediate tube 108 and is attached at its right-hand end to inner end piece 124 and at its left-hand end to a ring 142. An intermediate coil 144 is disposed between tube 108 and tube 110. Coil 144 is of the same character as coil 132 except that its parameters, including number of turns, will vary to achieve a desired result in terms of performance of the energy absorber under crash conditions.

End piece 114 of energy absorbers 20 comprises a generally cylindrical cap having three slots 146 therein. A load variation disc 74a comprises a disc with three tangs 148 alignable with, and fittable into, slots 146 defined by end piece 114. As noted hereinabove, the disc 74a is pivotably mounted on energy absorber 20 to be movable in response to the action of actuator assembly 60 relative to the girth of a user of the helicopter seat 10. As depicted in FIG. 7a, the upper energy absorber 20 is in its disengaged or "off" condition, wherein tangs 148 of disc 74a do not engage the slots 146 of end piece 114; in FIG. 7b, the upper energy absorber 20 is depicted in the "on" or "engaged" condition in which tangs 148 of disc 74a are disposed within, and engage, slots 146 of end piece 114.

As is described in more detail hereinbelow, the intermediate energy absorbers 22 and upper energy absorbers 20 are in the engaged condition with their respective load variation engagement discs in response to the use of helicopter seat 10 by a "heavyweight" occupant, are in a fully disengaged condition in response to a "lightweight" user and are in a mixed condition (in which the upper energy absorber 20 are disengaged and the intermediate energy absorbers 22 are engaged), for a "middleweight" occupant of the helicopter seat 10.

Referring to FIGS. 10a and 10b, intermediate energy absorbers 22 are, like upper energy absorbers 20, constructed in accordance with the patents and patent application referred to and incorporated by reference herein. The intermediate energy absorbers 22 differ from upper energy absorbers 20 in that they contain two additional intermediate tubes and two additional inner coils. Intermediate energy absorber 22 comprises an outer tube 150, first intermediate tube 152 disposed telescopically within tube 150, a second intermediate tube 154 disposed inwardly of tube 152, a third intermediate tube 155, and an inner tube 156 disposed within tube 155. Outer tube 150 is attached to outer end piece 158 which, like the corresponding end piece in upper energy absorbers 20, has three slots 160. First intermediate tube 152 is attached to end piece 162 disposed at the left-hand end of energy absorber 22. A ring 164 is attached at the right-hand end of intermediate tube 152. A helical coil of wire 166 is frictionally engaged between the inner surface of tube 150 and tube 152. As in the case of the energy absorbers referred to hereinabove, a detailed description of the construction of such helical coils is given in conjunction with the United States patents and applications which are incorporated by reference herein. Second intermediate tube 154 is disposed inwardly of tube 152 and is partially contained within the volume defined by outer tube 150. A ring 167 is attached to the left-hand end of tube 154; a ring 168 is attached at the right-hand end of tube 154 within the volume occupied by outer tube 150. Tube 154 is a "floating" tube in that it is not attached other than to rings 167 and 168.

Third intermediate tube 155 is rigidly attached to an inner end piece 170 at the right-hand end of energy absorber 22 and to ring 168. Inner tube 156 is rigidly attached to end piece 162. In the same manner as ball joints 116, 120 are attached to upper energy absorber 20, ball joint 174 and ball joint 176 are attached to the left-hand end and right-hand end, respectively, of energy absorber 22.

An intermediate coil 178 is disposed between, and in frictional engagement with first intermediate tube 152 and second intermediate tube 154. Coil 178 of the same character as coil 166 except that its parameters, including the number of turns, will vary to achieve a desired result in terms of performance of the energy absorber under crash conditions. A third coil 180 is disposed between tube 154 and tube 155 and is frictionally engaged therewith. A fourth coil 182 is frictionally engaged in the same manner as the other coils aforesaid between inner tube 156 and third intermediate tube 155.

Figure 8A:
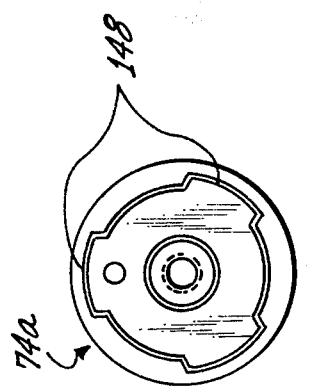
FIG. 8a is a front view of a load variation disc employed in accordance with the invention, depicted in the disengaged condition.
Figure 19A:
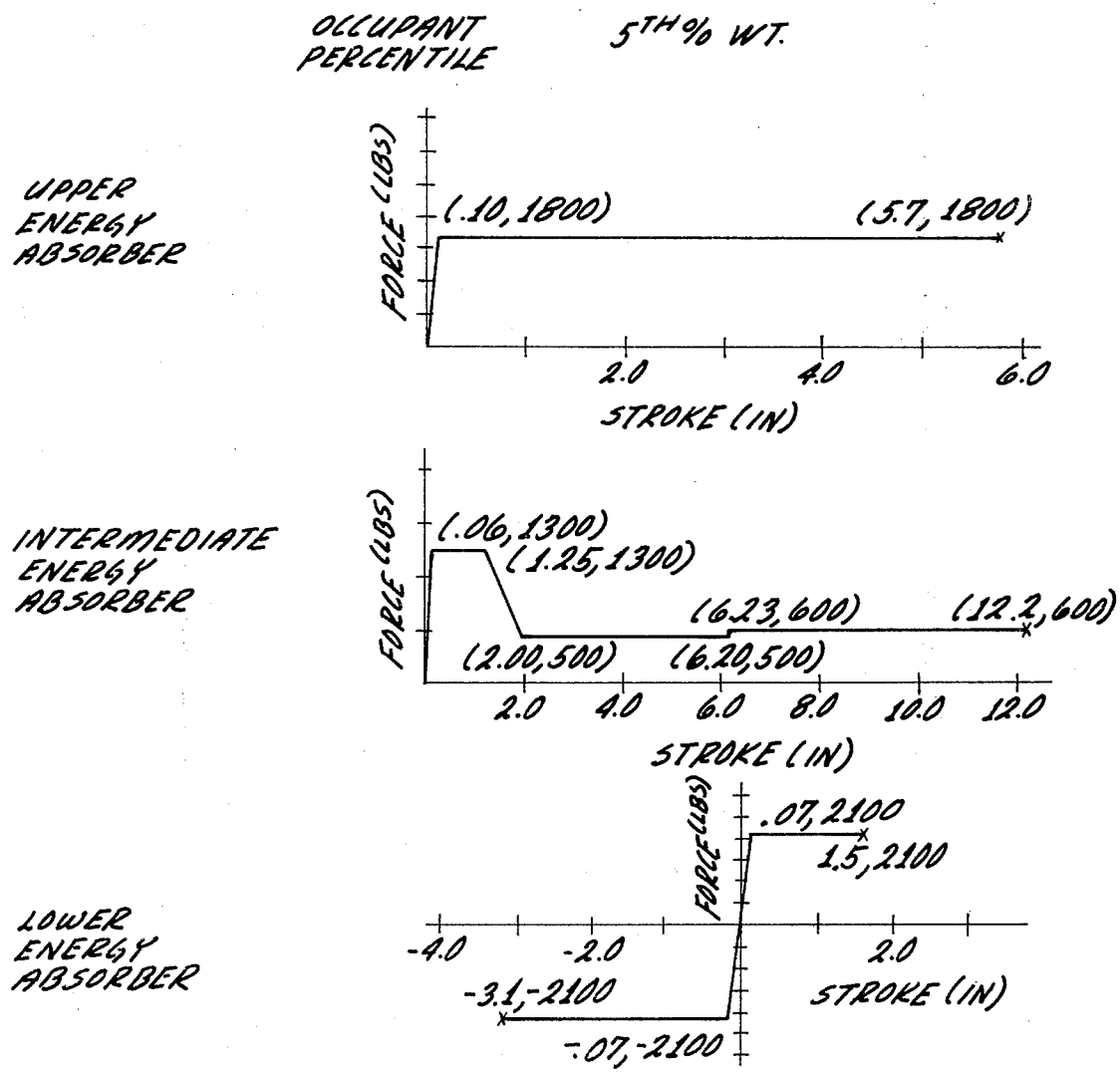
Figure 19B:
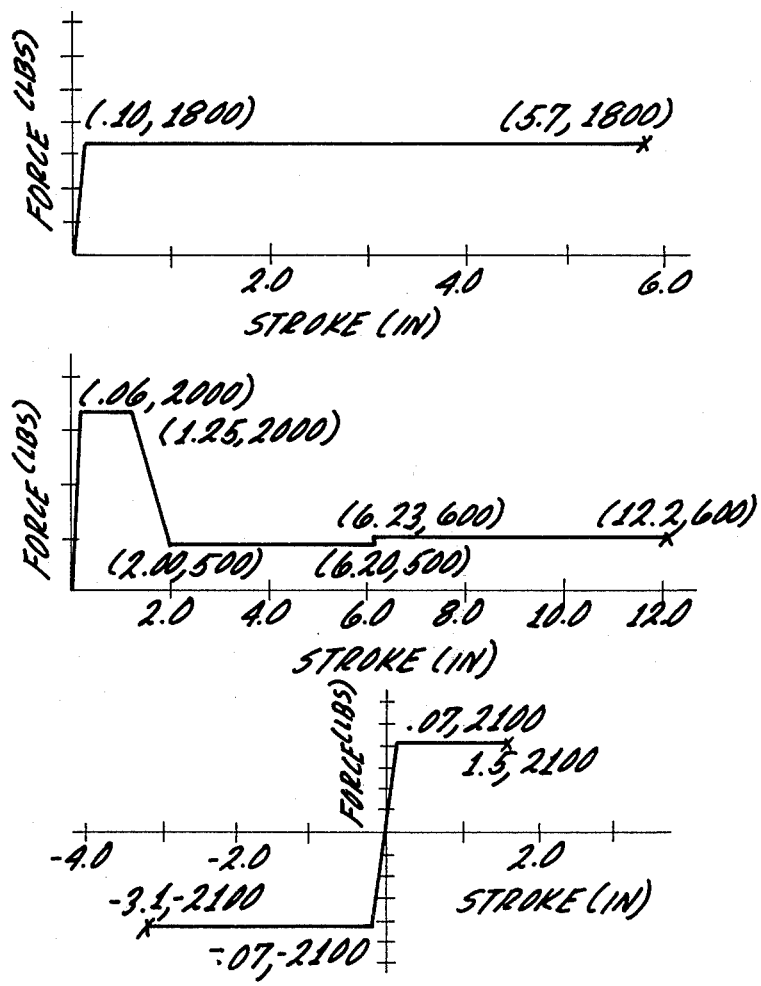

Both the upper energy absorbers 20 and the intermediate energy absorbers 22 operate to absorb energy in tension and compression. As depicted in FIGS. 7a, 8a and 10a, the energy absorbers 20, 22, respectively, are in the "disengaged" condition wherein the load variation engagement discs relative thereto are in the disengaged position. With respect to energy absorbers 20, 22, the load variation discs are of the same form and dimensions, and thus the same reference numerals and designations are employed therewith. As noted hereinabove, there are three conditions of the total energy absorber system: a first, completely disengaged, condition wherein the upper energy absorbers 20 and the lower intermediate energy absorbers 22 are in the disengaged condition, corresponding to the "lightweight" occupant of the helicopter seat 10; secondly, corresponding to the "middle weight" occupant of the helicopter seat, the intermediate energy absorbers 22 are in the engaged condition while the upper energy absorbers 20 are disengaged; and thirdly, corresponding to the "heavyweight" occupant of the helicopter seat, the upper energy absorbers 20 and the lower energy absorbers 22 are all in the engaged condition.

FIGS. 9a, 9b, 12a, and 12b comprise graphical representations of the relationships between displacement (also referred to as "stroke") of energy absorbers in accordance with the invention vs. force applied thereto, either in tension or compression, as a result of crash or other conditions in which stress is exerted upon the energy absorbers. These figures will be used in conjunction with description of operation of energy absorbers employed in accordance with the invention.

As depicted in FIGS. 8a, 10a, and 12a, the intermediate energy absorber 22 is in the disengaged condition and the position of the load variation disc 148 is depicted, together with a graphical depiction of the relationship between force and displacement of the disengaged energy absorber 22. FIGS. 8b, 10b, and 12b depict energy absorbers 22 in the engaged condition, together with the position of the load variation disc 74a in that condition and a graphical depiction of the relationship between force and displacement in that condition. Operation of intermediate energy absorbers 22, depicted in FIG. 10a, is as follows. In describing the operation of energy absorbers herein, for clarity of description it will be assumed that they are being operated with a rightward stroke, i.e., in tension brought to bear against the ball joints on the right-hand end of the respective energy absorbers. It will be seen, as is described in detail in the aforesaid copending patent application, that energy absorbers herein operate in both tension and compression modes; thus, the description of operation in tension is identical to that of operations in compression. Additionally, it will be assumed for clarity and simplicity that while the right-hand ball joints of the energy absorbers are subjected to tension causing rightward movement, the left-hand end ball joints will be considered to be fixed.

Initially, in the disengaged condition, energy absorber 22 experiences a rightward motion of ball joint 176 upon build-up of force to the level $F_1+F_3$, the sum of the force constants of coils 178, 182. Inner end piece 170 attached to ball joint 176 is thus caused to move rightwardly, in turn causing rightward movement of third intermediate tube 155 and, attached thereto, of second intermediate tube 154 which is attached to inner tube 156 by means of ring 168. As a result of the motions of tubes 154, 156, coils 178 and 182 are caused to roll. Because tubes 154, 155 are moving simultaneously, coil 180 does not roll. Because the engagement disc 176 is in the disengaged condition, the outer tube 150 does not move, and as a result, coil 166 is inactive and does not roll. The stroke-force relationship in this phase of operation is given by the line in FIG. 12a between $S_1$ and $S_2$. During this phase, the stroking force is the sum of the force constants of coils 178, 180 or $F_1+F_3$.

After displacing or stroking to distance $S_2$ as depicted in the graph in FIG. 12a, the coil 182 begins to emerge from between the tubes surrounding it. For this reason, over the interval from $S_2$ to $S_3$, the stroking force decreases uniformly until coil 182 is completely disengaged, which occurs at $S_3$. At this point, the force is reduced to that of coil 178 ($F_1$) only.

Thereafter, coil 178 continues to roll to the right at force level $F_1$ until after the stroke reaches the point $S_4$, at which the space between its surrounding tubes ceases to exist. At this point, the stroking force level rises until the coil 180 begins to roll at the $S_5$ displacement. At this point, tube 155 continues to stroke to the right at force level $F_2$ corresponding to coil 180. At displacement $S_E$, coil 180 ceases to stroke as its surrounding tubes cease to move, and the force will rise rapidly until the device supports the final load with no substantial change in length.

Operation of energy absorber 22 with engagement disc 74a disposed in the engaged condition (graphically depicted in FIG. 12b) is identical with that of operation of energy absorber 22 in the disengaged condition except that in the displacement from $S_1$ to $S_2$ the helical coil 166 is active since in this condition, the tangs 148 of disc 74a engage with the slots 160 of end piece 158 such that end piece 158 moves together with inner end piece 170 under tension. As a result of the movement of end piece 158, outer tube 150 moves together with the end piece, thus causing operation of coil 166. Such operation of coil 166 raises the stroking force level at the interval $S_1$-$S_2$ to the level $F_1+F_2+F_3$ in FIG. 12b, representing the high force level configuration of the energy absorber 22. At the point $S_2$, coil 166 begins to come out from between its surrounding tubes, and the force of stroking drops to the level of $F_1$ at point $S_3$. Further operation is the same as described with respect to the disengaged condition of energy absorber 22 subsequent to the point $S_3$.

With respect to upper energy absorbers 20, operation is similar to that of intermediate energy absorbers 22 as described hereinabove and is as follows.

Figure 9A:
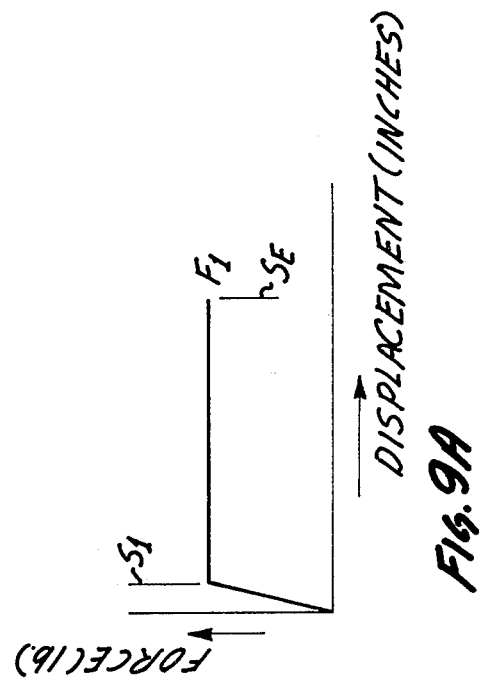
FIG. 9a is a graphical representation of force-displacement relationships of the energy absorber of FIG. 7a, the units of force being pounds and the units of displacement being inches.

With disc 74a in the disengaged condition, coil 144 begins to roll when the applied force reaches a level designated as $F_1$ in the force/displacement diagram in FIG. 9a. As in the case of energy absorber 22, the left end ball joint 116 is considered to be fixed, and tension is considered to be exerted upon right-hand ball joint 120; as a result, the inner tube 110, which is attached to innter end piece 124, begins to move to the right while coil 144 is rolling. This continues until coil 144 contacts ring 142 and ceases to stroke since it is contracted and can no longer operate. This occurs at displacement designated as $S_e$. The force then rises rapidly to the final or "bottom out" load with no further significant change in length. Because the engagement disc 74a is in the disengaged condition, where the tangs 148 do not contact the outer end piece, the latter does not move, and thus coil 132 does not roll and is inactive.

In the engaged condition, where the disc 74a is positioned so that tangs 148 are engaged with slots 146 of outer end piece 114, the latter is caused to move together with inner end piece 124 so that stroking begins at a force level designated as $F_1+F_2$ in FIG. 9b. This force level is the sum of thenow active coil 132 and active coil 144. After the stroke proceeds to distance $S_2$, coil 132 begins to emerge from between its surrounding tubes. During the interval $S_2$-$S_3$, the stroking force decreases uniformly until coil 132 is completely disengaged, which occurs at $S_3$. At this point, the force is reduced to that of coil 144, the $F_1$ element, and the remaining operation is identical to that with the engagement disc in the disengaged condition.

Referring to FIGS. 11a and 11b, energy absorbers 24 are the same as those described and claimed in the aforesaid U.S. Pat. No. 4,150,805 incorporated by reference herein. Briefly, they comprise an outer tube 200 in which an inner tube 202 is telescoped. A right-hand ball joint 204 is attached to an end piece 206 at the right-hand end of tube 202. Inner space 208 is attached to ball joint 204 by being screwed thereonto. End piece 210 is secured at the left-hand end of tube 200, and a ball joint 212 is secured thereto by being screwed thereinto. A coil element 214 is disposed between tubes 200, 202. Operation of the energy absorber 24 is described in said U.S. Pat. No. 4,150,805. Assuming as in the case of energy absorbers 20, 22 ball joint 212 to be fixed and tension to be exerted upon ball joint 204 to displace it rightwardly, the force rises rapidly until reaching at $S_1$ the level of $F_1$ which is the force resulting from rolling of coil 214. This continues until a ring 216 is attached at the lefthand end of tube 202 contacts the end of coil 214, causing it to "bottom out". At this point, stroking continues with no significant change in length and at the "bottom out" force level $F_1$. It should be noted that the lower energy absorbers 24 initially are operable in tension or compression depending on crash conditions and crash orientation.

Figure 13C:
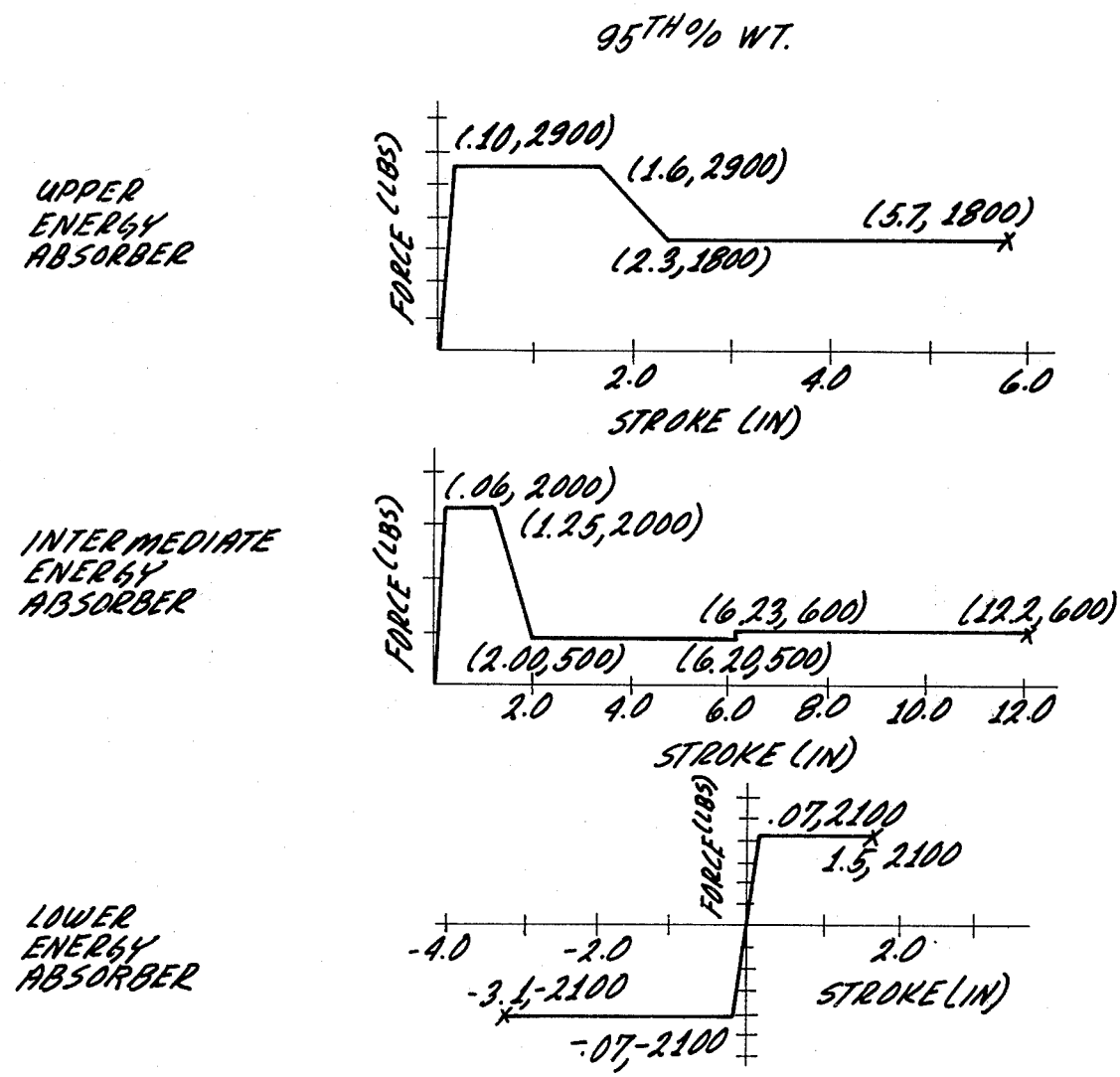
FIG. 13c is a depiction in graphical form of the performance characteristics of crashworthy helicopter seats in accordance with the invention for heavyweight seat occupants.

FIGS. 13a, 13b, 13c comprise graphical representations of displacement-force characteristics (displacement in inches, force in pounds) of energy absorbers employed with hellicopter seats in accordance with the invention, for various occupant weight. FIG. 13a discloses that for the lightweight seat occupant, that is, the occupant in the fifth weight percentile, the response includes the combined responses of the upper energy absorber 20, the intermediate energy absorber 22, both in the disengaged condition, and the lower energy absorber 24. It should be observed that lower energy absorber 24 does not have a disengaged or engaged condition but rather responds uniformly in tension and compression without any variation relative to the weight of the seat occupant.

FIG. 13b depicts the situation with respect to the 50th percentile, or middleweight occupant, and refers to the disengaged condition of the upper energy absorbers 20, the engaged condition of intermediate energy absorbers 22, and the operation of lower energy absorbers 24.

FIG. 13c refers to operation with respect to the heavyweight or 95th percentile occupant and depicts operation of upper energy absorbers 20 in the engaged condition, intermediate energy absorbers 22 in the engaged condition, and operation of lower energy absorbers 24.

The specific numbers given with respect to FIGS. 13a, 13b, 13c, are those which have been discovered to provide optimal force/stroke characteristics to accommodate the needs of various weight ranges of occupants.

FIG. 14 depicts in tabular form the peak acceleration (in g's) and center of gravity displacement of the seat-man combination for the three different weight types of seat occupants. As disclosed by the tables, the differences between the accelerations and displacements experienced by occupants of the wide range of weights from the fifth percentile to the 95th percentile is not considerable. The specific figures given for the various entries in the table are based upon responses described in the graphs in FIGS. 13a, 13b, and 13c.

As depicted in FIGS. 15, 16 and 17, provision is made in accordance with the invention for adjusting the lap belt 26 to reflect the weight of the occupant of the seat 10 as a function of the occupant's girth and thus of the adjustable length of the adjustable portion of the lap belt. As depicted in FIG. 15, the adjusted lap belt length, to which the weight of the occupant is related, is affected by the weight of the occupant, the elastic characteristics of the seat cushion, the position of the lap belt on the occupant's body, the breadth and depth of the occupant's body in the region of the lap belt and the cross-sectional body shape in this region. It has been discovered that use of certain assumption relative to some of these factors provides close correlation between occupant weight and length of the adjustable lap belt 26.

FIG. 15 depicts a side view of a 95th percentile (i.e., "heavyweight") occupant and the occupant's orientation in the seat bucket 12. A seat cushion (not shown) is employed with seats in accordance with the invention; displacement of the occupant's body from the seat bucket 12 is due to the seat cushion. The chest depth, designated "C", and the thigh clearance height, designated "T", may be taken from any convenient reference and in a particular military application are derived from military standard No. 1472B (MIL-STD-1472B), as described more fully hereinbelow. A portion of the occupant's torso from approximately the middle back to the upper thigh is included in FIG. 15. A seat reference point 200 (SRP) is defined by the inner section of a line B constituting a line tangent to the occupant's back and a line TH constituting a tangent to the bottom of the occupant's thigh.

Figure 18:
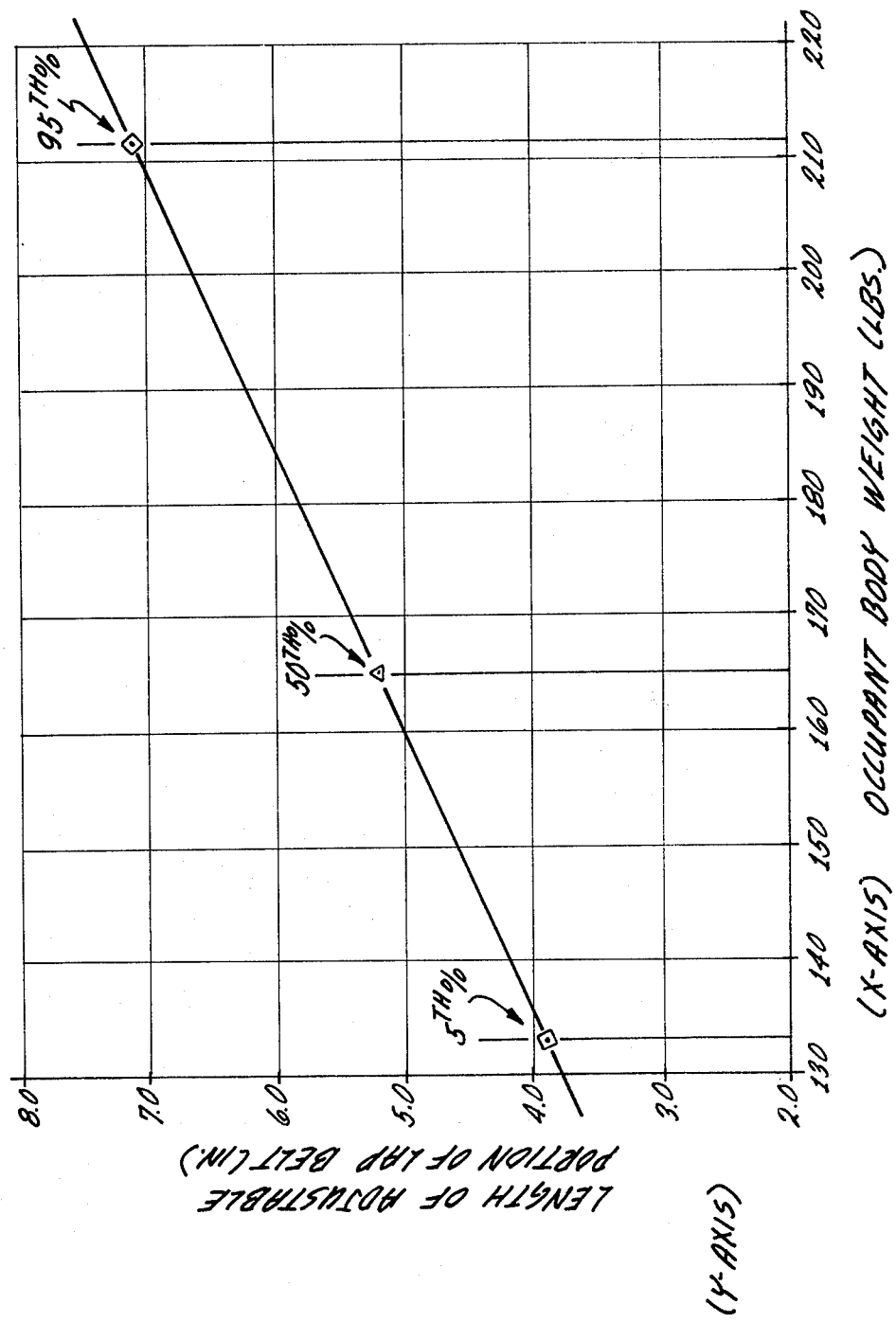
FIG. 18 is a graphical depiction of a relationship between the length of the adjustable portion of a lap belt employed in connection with the invention (girth of seat occupant) versus occupant body weight.

It has been discovered that compression of the back cushion may be treated as equal for all occupants since the seat back 14 is inclined a small angle from the vertical; thus, the back tangent line location is substantially the same for all occupants. The height H of the seat cushion disposed upon bucket 200 is proportional to the weight of the occupant and is defined as the difference in height between the top of the bucket and the top of the occupant's thigh. Therefore, the height of the thigh clearance "T" depends upon the weight of the occupant. The lap belt 26, which is attached at a lap belt anchor point 29 wraps around the occupant in a plane defined by section 16—16. The plane is defined by the intersection of the lap belt anchor point 206 and lines C and T. FIG. 18 comprises a graphical representation of the relationship between the girth and weight for military personnel, who could be expected to utilize crashworthy helicopter seats in one of the applications of the invention, namely to military aircraft. As noted, dimensions for the "heavyweight" occupant were obtained from military standards. Dimensions for a 5th percentile (i.e., "lightweight") occupant are assumed to be 80 percent of those for the 95th percentile occupants for those dimensions not given in MIL-STFD-1472B. Dimensions for a middleweight occupant are interpolated between those of the heavyweight and the lightweight types of occupants. The invention, of course, is not limited in its application to any particular population or context, and the particular parameters of the relationship between girth and weight may be varied to accommodate varying populations as, for example, in the case in which the invention is applied in a commercial aviation context.

FIG. 17 depicts a body cross-section at 16—16 for a heavyweight occupant. Hip breadth "B" and buttock depth "D" were obtained from MIL-STD-1472B. Periphery of the body cross-section is approximated by three circular arcs mutually tangent to one another and to a circumscribed rectangles defined by "B" and "D"; radii of curvature defining the body cross-section are depicted in the figure. Allowance for clothing thickness was made by adding a constant to 0.25 inch to the dimensions given in MIL-STD-1472B.

FIG. 16 depicts a view through section 16—16 showing adjustability of lap belt 26 to determine occupant girth. The center line of lap belt 26 is assumed to pass through section 16—16 and causes no deformation of the cross-section of the occupant. The occupant girth is reflected by the length of adjustable portion 27 of lap belt 26. This length is measured from the belt clasp assembly 30 to the lap belt lug 28. The same measurement, of course, applies to the second adjustable portion 27 of the belt 26. In this manner, the length of the adjustable portion of the lap belt 26 is related to the weight of the occupant of the seat 10, thereby enabling adjustability of the system in accordance with occupant weight. This presents the significant advantage of improving safety and comfort of occupants of a wide range of body weight.

Though particular embodiments of the invention have been described and depicted hereinabove, the invention is defined solely by the appended claims interpreted in light of the specification.

What is claimed is:

1. A variable energy absorbing system for crashworthy seats in aircraft to protect occupants of varying weights from crash-induced injury comprising:
sensor means connectable to said seat for sensing the weight of occupants thereof and for providing a signal in response thereto;
actuation means connectable to said sensor means and responsive to signals therefrom to actuate energy absorber means; and
energy absorber means connectable to said actuation means and connectable between said seat and said aircraft, said energy absorber means absorbing energy from a crash in at least a first stage following the crash and a second stage following said first stage, said energy absorber means absorbing energy at a higher level of force during said first stage and at a lower level of force in said second stage, said energy absorber means being responsive to signals from said actuation means to vary the level of force in said first or second stage in response to varying weight of occupants of said seat.

2. The invention as set forth in claim 1 wherein said sensor means senses the weight of occupants of said seat by means of the lengths of adjustable sections of a lap belt associated with said seat, the length of said lap belt sections being dependent upon the girth of occupants of said seat and said girth being related to the weight of occupants of said seat.

3. The invention as set forth in claim 1 wherein said energy absorber means comprises upper energy absorber means and intermediate energy absorber means, the latter being disposed between said upper energy absorber means and the floor of said aircraft.

4. The invention as set forth in claim 3 wherein said upper energy absorber means and said intermediate energy absorber means each have an "on" condition and an "off" condition such that said upper energy absorber means and said intermediate energy absorber means operate at a higher level of force in said first stage in the "on" condition than in the "off" condition, said upper energy absorber means and said intermediate energy absorber means being responsive to signals from said actuation means to assume said "on" and "off" conditions.

5. The invention as set forth in claim 4 wherein said upper energy absorber means and said intermediate energy absorber means all assume said "on" condition in response to signals from said actuation means in response to use of said seat by the user whose weight is substantially equal to that of a person in the 95th percentile of user weight.

6. The invention as set forth in claim 4 wherein said intermediate energy absorber means assumes the "on" condition in response to the use of said seat by persons having weight between the 50th percentile and the 95th percentile of weight of users of said seat.

7. The invention as set forth in claim 1 further including lower energy absorber means connectable between said seat and said aircraft disposed between said intermediate energy absorber means and the floor of said aircraft, said lower energy absorber means absorbing energy from crash-induced motion at a force level which is intermediate between the first stage force level of said upper energy absorber means and the first stage force level of said intermediate energy absorber means.

8. The invention as set forth in claim 4 wherein response of the upper energy absorber means in the "on" condition is substantially graphically depicted in FIG. 13c of the drawing.

9. The invention as set forth in claim 4 wherein the response of said intermediate energy absorber means in the "on" condition is shown in FIG. 13c of the drawing.

10. The invention as set forth in claim 1 wherein said energy absorber means comprises a plurality of coil elements and a plurality of movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that upon initial motion induced by a crash of said aircraft, at least one of said coil elements will roll upon an adjoining movable element, thereby absorbing energy of said crash.

11. The invention as set forth in claim 3 wherein said intermediate energy absorber means comprises at least four coil elements and at least five movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that upon initial motion induced by a crash of said aircraft, at least two of said coil elements will roll upon an adjoining movable element, thereby absorbing energy of said crash.

12. The invention as set forth in claim 4 wherein said intermediate energy absorber means comprises at least four coil elements and at least five movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that upon initial motion induced by a crash of said aircraft, when said upper energy absorber means is in said "on" condition, at least three of said coil elements will roll upon adjoining movable elements, thereby absorbing energy of said crash and such that upon initial motion induced by a crash of said aircraft, when said energy absorber means is in the "off" condition, two of said coil elements will roll upon adjoining movable elements, thereby absorbing energy of said crash.

13. The invention as set forth in claim 3 wherein said upper energy absorber means comprises at least three coil elements and at least four movable elements telescoped within one another such that each of said coil elements is disposed between a pair of adjoining telescoping movable elements prior to a crash of said aircraft, said telescoping movable elements being adapted to be movable under crash conditions and being arranged such that upon initial motion induced by said crash of said aircraft, one of said coil elements will roll upon an adjoining movable element, thereby absorbing energy of said crash.

14. The invention as set forth in claim 4 wherein said upper energy absorber means comprises at least three coil elements and at least four movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that, in the "on" condition, upon initial motion induced by a crash of said aircraft, two of said coil elements will roll upon adjoining movable elements, thereby absorbing energy of said crash and such that, in the "off" condition, upon initial motion induced by a crash of said aircraft, one of said coil elements will roll upon an adjoining movable element, thereby absorbing energy of said crash.

15. The invention as set forth in claim 4 further including a seat and wherein said upper energy absorber means is connected between said seat and the frame of said aircraft and wherein said intermediate energy absorber means is connected between said seat and the frame of said aircraft.

16. The invention as set forth in claim 3 wherein said energy absorber means includes lower energy absorber means connectable between said seat and said frame of said aircraft and disposed between said intermediate energy absorber means and the floor of said aircraft.

17. The invention as set forth in claim 16 wherein said lower energy absorber means comprises one coil element and two movable elements telescoped within one another such that said coil element is disposed between said movable elements prior to a crash of said aircraft, said movable elements being adapted to be movable under crash conditions of the aircraft and being arranged such that upon motion induced by a crash of said aircraft, said coil element will roll upon an adjoining movable element, thereby absorbing energy of said crash.

18. The invention as set forth in claim 4 wherein the response of the upper energy absorber means in the "off" condition is substantially graphically depicted in FIG. 13a of the drawing.

19. The invention as set forth in claim 4 wherein response of the intermediate energy absorber means in the "off" condition is substantially graphically depicted in FIG. 13a of the drawing.

20. A crashworthy helicopter seat for protecting occupants of varying weights from crash-induced injury comprising:
a seat;
sensor means connected to said seat for sensing the weight of occupants thereof and for providing a signal in response thereto;
actuation means connectable to said sensor means and responsive to signals therefrom to actuate energy absorber means;
and energy absorber means connected to said actuation means and connected between said seat and said aircraft, said energy absorber means absorbing energy from a crash in at least a first stage following the crash and a second stage following the first stage, said energy absorber means absorbing energy at a higher level of force during said first stage and at a lower level of force in said second stage, said energy absorber means being responsive to signals from said actuation means to vary the level of force in said first or second stage in response to varying weight of occupants of said seat.

21. The invention as set forth in claim 20 wherein said sensor means senses the weight of occupants of said seat by means of the lengths of adjustable sections of a lap belt associated with said seat, the length of said lap belt sections being dependent upon the girth of occupants of said seat and said girth being related to the weight of occupants of said seat.

22. The invention as set forth in claim 20 wherein said energy absorber means comprises upper energy absorber means and intermediate energy absorber means, the latter being disposed between said upper energy absorber means and the floor of said aircraft.

23. The invention as set forth in claim 22 wherein said upper energy absorber means and said intermediate energy absorber means each have an "on" condition and an "off" condition such that said upper energy absorber means and said intermediate energy absorber means operate at a higher level of force in said first stage in the "on" condition than in the "off" condition, said upper energy absorber means and said intermediate energy absorber means being responsive to signals from said actuation means to assume said "on" and "off" conditions.

24. The invention as set forth in claim 23 wherein said upper energy absorber means and said intermediate energy absorber means all assume said "on" condition in response to signals from said actuation means in response to use of said seat by the user whose weight is substantially equal to that of a person in the 95th percentile of user weight.

25. The invention as set forth in claim 23 wherein said intermediate energy absorber means assumes the "on" condition in response to the use of said seat by persons having weight between the 50th percentile and the 95th percentile of weight of users of said seat.

26. The invention as set forth in claim 1 further including lower energy absorber means connected between said seat and said aircraft disposed between said intermediate energy absorber means and the floor of said aircraft, said lower energy absorber means absorbing energy from crash-induced motion at a force level which is intermediate between the first stage force level of said upper energy absorber means and the first stage force level of said intermediate energy absorber means.

27. The invention as set forth in claim 23 wherein response of the upper energy absorber means in the "on" condition is substantially graphically depicted in FIG. 13c of the drawing.

28. The invention as set forth in claim 23 wherein the response of said intermediate energy absorber means in the "on" condition is shown in FIG. 13c of the drawing.

29. The invention as set forth in claim 20 wherein said energy absorber means comprises a plurality of coil elements and a plurality of movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that upon initial motion induced by a crash of said aircraft, at least one of said coil elements will roll upon an adjoining movable element, thereby absorbing energy of said crash.

30. The invention as set forth in claim 22 wherein said intermediate energy absorber means comprises at least four coil elements and at least five movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that upon initial motion induced by a crash of said aircraft, at least two of said coil elements will roll upon an adjoining movable element, thereby absorbing energy of said crash.

31. The invention as set forth in claim 23 wherein said intermediate energy absorber means comprises at least four coil elements and at least five movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that upon initial motion induced by a crash of said aircraft, when said upper energy absorber means is in said "on" condition, at least three of said coil elements will roll upon adjoining movable elements, thereby absorbing energy of said crash and such that upon initial motion induced by a crash of said aircraft, when said energy absorber means is in the "off" condition, two of said coil elements will roll upon adjoining movable elements, thereby absorbing energy of said crash.

32. The invention as set forth in claim 22 wherein said upper energy absorber means comprises at least three coil elements and at least four movable elements telescoped within one another such that each of said coil elements is disposed between a pair of adjoining telescoping movable elements prior to a crash of said aircraft, said telescoping movable elements being adapted to be movable under crash conditions and being arranged such that upon initial motion induced by said crash of said aircraft, one of said coil elements will roll upon an adjoining movable element, thereby absorbing energy of said crash.

33. The invention as set forth in claim 23 wherein said upper energy absorber means comprises at least three coil elements and at least four movable elements telescoped within one another such that each of said coil elements is disposed between a pair of adjoining telescoping movable elements prior to a crash of said aircraft, said telescoping movable elements being adapted to be movable under crash conditions of the aircraft and being arranged such that, in the "on" condition, upon initial motion induced by a crash of said aircraft, two of said coil elements will roll upon adjoining movable elements, thereby absorbing energy of said crash and such that, in the "off" condition, upon initial motion induced by a crash of said aircraft, one of said coil elements will roll upon an adjoining movable element, thereby absorbing energy of said crash.

34. The invention as set forth in claim 22 wherein said energy absorber means includes lower energy absorber means connectable between said seat and said frame of said aircraft and disposed between said intermediate energy absorber means and the floor of said aircraft.

35. The invention as set forth in claim 34 wherein said lower energy absorber means comprises one coil element and two movable elements telescoped within one another such that said coil element is disposed between said movable elements prior to a crash of said aircraft, said movable elements being adapted to be movable under crash conditions of the aircraft and being arranged such that upon motion induced by a crash of said aircraft, said coil element will roll upon an adjoining movable element, thereby absorbing energy of said crash.

36. The invention as set forth in claim 23 wherein the response of the upper energy absorber means in the "off" condition is substantially graphically depicted in FIG. 13a of the drawing.

37. The invention as set forth in claim 23 wherein response of the intermediate energy absorber means in the "off" condition is substantially graphically depicted in FIG. 13a of the drawing.

38. A variable energy absorbing system for crashworthy seats in an aircraft to protect occupants of varying weights from crash induced injury comprising,
sensor means connectable to said seat for sensing the weight of an occupant thereof and for providing a signal in response thereto,
actuation means connectable to said sensor means in response to signals therefrom to actuate energy absorber means, and
energy absorber means connectable to said actuation means and connectable between the said seat and aircraft, said energy absorbing means being in the form of energy absorbing devices capable of absorbing energy at different levels of force in response to signals from said actuation means, the said signals being responsive to varying weight of the occupant of said seat.

39. The invention as in claim 38, wherein said sensor includes lap belt means associated with the seat wherein the length of the lap belt sections is dependent upon the girth of the occupant of the seat, said girth being related to the weight of the occupant, the signal of the sensor means being dependent upon the said length of lap belt.

* * * * *